(12) United States Patent
Yu et al.

(10) Patent No.: US 11,770,866 B2
(45) Date of Patent: Sep. 26, 2023

(54) SERVICE DATA TRANSMISSION METHOD, ACCESS POINT, AND STATION

(71) Applicant: Huawei Technologies Co., Ltd., Guangdong (CN)

(72) Inventors: Jian Yu, Shenzhen (CN); Peter Loc, Cupertino, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/287,929

(22) Filed: Feb. 27, 2019

(65) Prior Publication Data
US 2019/0200404 A1 Jun. 27, 2019

Related U.S. Application Data

(63) Continuation of application No. PCT/CN2017/094448, filed on Jul. 26, 2017.

(30) Foreign Application Priority Data

Aug. 29, 2016 (CN) .......................... 201610751572.2

(51) Int. Cl.
| | |
|---|---|
| *H04W 76/11* | (2018.01) |
| *H04W 4/90* | (2018.01) |
| *H04W 72/04* | (2023.01) |
| *H04W 74/08* | (2009.01) |
| *H04W 60/04* | (2009.01) |

(Continued)

(52) U.S. Cl.
CPC .............. *H04W 76/11* (2018.02); *H04W 4/90* (2018.02); *H04W 60/04* (2013.01); *H04W 72/04* (2013.01); *H04W 72/0446* (2013.01); *H04W 74/0808* (2013.01); *H04W 74/0816* (2013.01); *H04L 5/0007* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2008/0107063 A1* | 5/2008 | Oleszczuk | ............ H04W 16/10 370/315 |
| 2012/0275305 A1* | 11/2012 | Lin | .................. H04W 74/0841 370/235 |

(Continued)

FOREIGN PATENT DOCUMENTS

| | | |
|---|---|---|
| CN | 102595601 A | 7/2012 |
| CN | 103686934 A | 3/2014 |

(Continued)

*Primary Examiner* — Srinivasa R Reddivalam

(57) ABSTRACT

Embodiments of this application provide a service data transmission method, an access point, and a station. The method includes: receiving, by a station, a control frame, where the control frame includes control information; contending for a resource based on the control information; and sending first-type service data of the station to an access point on the resource obtained by contention, where the control information is used to instruct the station to contend for the resource used to transmit the first-type service data. In the embodiments of this application, the access point triggers the station to perform a procedure of reporting uplink first-type service data, and this can improve transmission efficiency of service data.

20 Claims, 14 Drawing Sheets

(51) Int. Cl.
  *H04W 72/0446* (2023.01)
  *H04W 84/12* (2009.01)
  *H04L 5/00* (2006.01)

(56) References Cited

U.S. PATENT DOCUMENTS

| | | | |
|---|---|---|---|
| 2014/0133422 A1* | 5/2014 | Horiuchi | H04L 1/0023 370/329 |
| 2014/0301371 A1* | 10/2014 | Maeda | H04W 76/10 370/331 |
| 2014/0334387 A1* | 11/2014 | Doppler | H04W 74/0816 370/329 |
| 2014/0349663 A1* | 11/2014 | Shu | H04W 52/0219 455/450 |
| 2015/0131547 A1 | 5/2015 | Seok | |
| 2015/0230247 A1 | 8/2015 | Yang et al. | |
| 2016/0044693 A1 | 2/2016 | Sun et al. | |
| 2016/0234697 A1* | 8/2016 | Azizi | H04W 72/044 |
| 2016/0309508 A1* | 10/2016 | Li | H04W 74/006 |
| 2016/0330788 A1* | 11/2016 | Zheng | H04W 76/27 |
| 2016/0338040 A1* | 11/2016 | Lee | H04W 72/0413 |
| 2017/0055290 A1* | 2/2017 | Lv | H04L 5/0053 |
| 2017/0105143 A1* | 4/2017 | Seok | H04L 5/0091 |
| 2017/0127419 A1* | 5/2017 | Seok | H04W 72/0453 |
| 2017/0222973 A1* | 8/2017 | Bangma | H04L 67/26 |
| 2017/0230964 A1* | 8/2017 | Park | H04B 7/0452 |
| 2018/0270858 A1 | 9/2018 | Chen et al. | |
| 2018/0288743 A1* | 10/2018 | Choi | H04L 1/16 |
| 2019/0007977 A1* | 1/2019 | Asterjadhi | H04W 74/006 |
| 2020/0163127 A1* | 5/2020 | Chitrakar | H04W 72/1284 |

FOREIGN PATENT DOCUMENTS

| | | |
|---|---|---|
| CN | 103731809 A | 4/2014 |
| CN | 104038902 A | 9/2014 |
| CN | 104039016 A | 9/2014 |
| CN | 104094652 A | 10/2014 |
| CN | 104272845 A | 1/2015 |
| CN | 105828452 A | 8/2016 |
| EP | 2844014 A1 | 3/2015 |
| EP | 2908567 A1 | 8/2015 |
| EP | 3030035 A1 | 6/2016 |
| KR | 10-2008-0083089 A | 9/2008 |
| WO | 2012148183 A2 | 11/2012 |

* cited by examiner

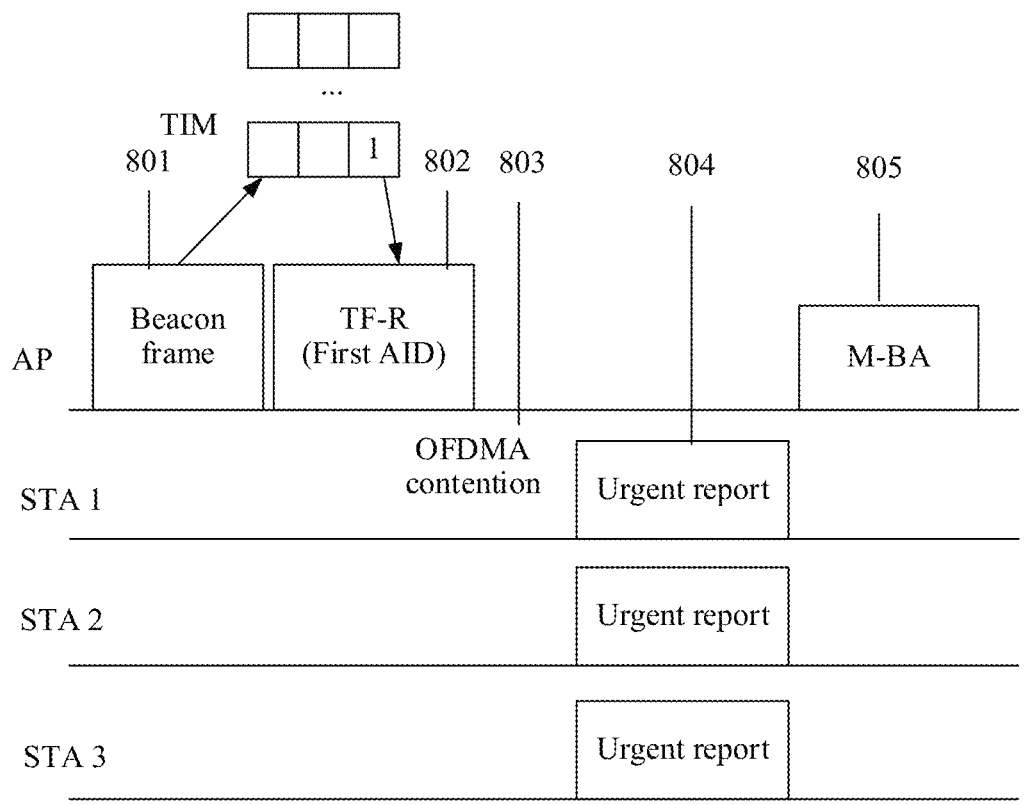

SERVICE DATA TRANSMISSION METHOD, ACCESS POINT, AND STATION

CROSS-REFERENCE TO RELATED APPLICATIONS

This application is a continuation of International Application No. PCT/CN2017/094448, filed on Jul. 26, 2017, which claims priority to Chinese Patent Application No. 201610751572.2, filed on Aug. 29, 2016. The disclosures of the aforementioned applications are hereby incorporated by reference in their entireties.

STATEMENT OF JOINT RESEARCH AGREEMENT

The subject matter and the claimed invention were made by or on the behalf of Innovative Wireless Technologies, Inc., of 1100 Main Street Lynchburg, Va. 24504, United States of America and Huawei Technologies Co., Ltd., of Shenzhen, Guangdong Province, P.R. China, under a joint research agreement titled "Technical and development consulting Services Agreement". The joint research agreement was in effect on or before the claimed invention was made, and the claimed invention was made as a result of activities undertaken within the scope of the joint research agreement.

TECHNICAL FIELD

This application relates to the field of wireless communications, and more specifically, to a service data transmission method, an access point, and a station.

BACKGROUND

With rapid development of Internet of Things, a concept and an application of a smart household and a smart city have gradually come into people's life. In an application of the Internet of Things, application scenarios such as anti-theft monitoring, safety monitoring about fire, gas, and the like, and monitoring about a body health status are put forward by people. For example, FIG. 1 is a schematic diagram of a scenario of a communications system that may be applied to an embodiment of this application. An access point (AP) and three stations (STA) (such as a STA 1, a STA 2, and a STA 3) are included in FIG. 1. When an emergency occurs, a STA responsible for monitoring needs to send an urgent report to the AP as soon as possible, so as to implement uplink transmission of the urgent report, or the AP needs to send the urgent report to a STA as soon as possible, so as to implement downlink transmission of the urgent report. In a wireless local area network (WLAN), the urgent report is extremely sensitive to a delay. Therefore, a corresponding mechanism needs to be designed to ensure that the urgent report can be transmitted between the STA and the AP as soon as possible.

In an existing design solution, when the STA has emergency service data to be transmitted, the STA sends a request to send (RTS) frame that carries an emergency information element (IE). When receiving the RTS frame that carries the emergency IE, the AP learns that the STA has the emergency service data to be transmitted, and returns a clear to send (CTS) frame to the STA. After RTS/CTS interaction is completed, all STAs that need to participate in urgent report transmission use a relatively short backoff window and a relatively small backoff value to contend for a channel, and a STA participating in non-urgent report transmission uses a relatively long backoff window and a relatively large backoff value to contend for a channel. In this way, prioritized transmission of the emergency service data is ensured by using the relatively short backoff window and the relatively small backoff value. However, this process is based on that the STA obtains the channel by contention, certain delay is inevitable. In addition, when the channel has been already obtained by contention, a plurality of STAs need to contend again, increasing a delay of a STA contending for a channel.

SUMMARY

Embodiments of this application provide a service data transmission method, an access point, and a station, so as to improve transmission efficiency of service data.

According to a first aspect, a service data transmission method is provided, including: receiving, by a first station STA, a control frame, where the control frame includes control information, and the control information is used to instruct the first STA to contend for a resource used to transmit first-type service data; contending, by the first STA, for the resource based on the control information; and sending, by the first STA, the first-type service data of the first STA to an access point AP on the resource obtained by contention.

In this embodiment of this application, the AP triggers a STA to perform a procedure of transmitting the first-type service data, and the STA sends the first-type service data to the AP on the resource obtained by contention. In this way, a contention delay can be reduced, and transmission efficiency can be improved.

In an embodiment of this application, the resource may be a channel, a resource unit (Resource Unit), or the like, and may be a time dimension, a frequency domain dimension, a spatial dimension, or a combination thereof, and contending for the resource may be contending for the channel, and so on.

With reference to the first aspect, in an implementation of the first aspect, the control information is a first association identifier (AID), and the receiving, by a first STA, a control frame includes: receiving, by the first STA, a trigger frame, where the trigger frame carries the first AID.

In an embodiment of this application, the control frame may be the trigger frame (TF). In particular, the control frame may be a trigger frame for random access (TF-R), and the TF-R is used to trigger the STA to perform random contention. The control information may be a non-zero AID carried in the trigger frame.

With reference to the first aspect and the foregoing implementation thereof, in another implementation of the first aspect, the first AID is used to instruct the first STA to randomly contend for the resource based on orthogonal frequency division multiple access (OFDMA), and the contending, by the first STA, for the resource based on the control information includes: randomly contending, by the first STA, for the resource based on the OFDMA.

In an embodiment of this application, the STA may randomly contend for the resource through carrier sense multiple access with collision avoidance (CSMA/CA), or may use OFDMA-based random contention by receiving the trigger frame. The OFDMA-based random contention may allow a plurality of STAs to simultaneously send data to the AP on different resource units. In this way, transmission efficiency can be improved.

With reference to the first aspect and the foregoing implementations thereof, in another implementation of the first aspect, a contention backoff window of the first STA is smaller than a contention backoff window of a second STA, and/or a backoff value of the first STA is less than a backoff value of the second STA, where the second STA is not configured to transmit the first-type service data.

A contention backoff window of a STA (such as the first STA) that is configured to transmit the first-type service data is smaller than a contention backoff window of a STA (such as the second STA) that is not configured to transmit the first-type service data, and/or a backoff value of the STA (such as the first STA) that is configured to transmit the first-type service data is less than a backoff value of the STA (such as the second STA) that is not configured to transmit the first-type service data. This helps the first STA more quickly obtain, by contention, the resource for transmitting the first-type service data.

With reference to the first aspect and the foregoing implementations thereof, in another implementation of the first aspect, the receiving, by a first STA, a control frame includes: receiving, by the first STA, an access frame configured by the AP, where the access frame includes the second AID and/or a restricted access window (RAW) control field, the second AID is used to instruct the first STA to contend for the resource used to transmit the first-type service data, and the RAW control field is used to indicate that a service data type of an access window is the first-type service data.

In an embodiment of this application, the access frame may be a frame carrying an emergency access window information element.

With reference to the first aspect and the foregoing implementations thereof, in another implementation of the first aspect, before the receiving, by a first STA, a control frame, the method further includes: receiving, by the first STA, a multiple user request to send (MU-RTS) frame, where the MU-RTS frame carries a third AID, and the third AID is used to indicate that the AP subsequently schedules the first STA to transmit the first-type service data; and sending, by the first STA, a clear to send CTS frame to the AP.

In an embodiment of this application, the MU-RTS frame may be used by the AP to request to send the control frame to the STA, so as to trigger the STA to start the procedure of transmitting the first-type service data, and may further cause another station to no longer contend for the resource, so as to reserve a transmission opportunity (TXOP) in advance to transmit the first-type service data for the station requested by the AP. In this way, transmission efficiency can be improved.

In an embodiment of this application, the first STA and another STA that needs to transmit the first-type service data may receive the MU-RTS frame sent by the AP, and the STA that receives the MU-RTS frame and needs to transmit the first-type service data may send the synchronous CTS frame to the AP, to be specific, the plurality of the STAs simultaneously send the CTS frame to the AP, and physical layer structures of CTS frames sent by the STAs are the same.

With reference to the first aspect and the foregoing implementations thereof, in another implementation of the first aspect, before the receiving, by a first STA, a control frame, the method further includes: receiving, by the first STA, a traffic indication map (TIM), where the TIM is used to indicate that the AP triggers the first STA to transmit the first-type service data in a current beacon frame period.

In an embodiment of this application, the TIM may be used by the AP to notify the STA in advance to prepare to transmit the first-type service data. Specifically, the TIM may notify, in advance, the STA that prepares to transmit the first-type service data to be no longer hibernated or to be in a wakeup state.

With reference to the first aspect and the foregoing implementations thereof, in another implementation of the first aspect, the method further includes: receiving, by the first STA, requirement information sent by a third STA, where the requirement information includes a fourth AID, and the fourth AID is used to indicate a requirement that the third STA transmits first-type service data or indicate a size of the first-type service data of the third STA that needs to be transmitted by the third STA; and sending, by the first STA, to the AP on the resource obtained by contention, the requirement that the third STA transmits the first-type service data or the size of the first-type service data of the third STA.

In an embodiment of this application, due to a channel status or a distance restriction, some STAs (such as a third STA) have a requirement for transmitting the first-type service data, but cannot transmit corresponding first-type service data to the AP. In this case, another surrounding STA may be used to help forward the transmission requirement or cache information, for example, a size of cache data.

With reference to the first aspect and the foregoing implementations thereof, in another implementation of the first aspect, the fourth AID is carried in a high efficient aggregated control field of a frame carrying the requirement information.

With reference to the first aspect and the foregoing implementations thereof, in another implementation of the first aspect, the receiving, by a first STA, a control frame includes: receiving, by the first STA by using a relay, the control frame sent by the AP; and the sending, by the first STA, the first-type service data of the first STA to the AP on the resource obtained by contention includes: sending, by the first STA by using the relay, the first-type service data of the first STA to the AP on the resource obtained by contention.

In an embodiment of this application, for a long-distance transmission requirement between some STAs and the AP, the relay may be needed to forward service data. The relay may receive the control frame from the AP and send the control frame to a STA associated with the relay. A STA that needs to transmit first-type service data receives the control frame sent by the relay, performs channel contention based on the control frame, and transmits the first-type service data (such as the urgent report) to the relay on a channel obtained by contention. After receiving the first-type service data sent by the STA, the relay may forward the first-type service data to the AP. The control frame in this embodiment of this application is used to instruct to contend for the resource for transmitting the first-type service data.

However, the foregoing manner of using a relay operation may increase a delay. To reduce the delay, the AP may transmit the control frame to the relay, and simultaneously send the control frame to the other STA (such as a STA 1). When sending the control frame to the STA 1 and the relay, the AP may perform resource allocation for an entire transmission bandwidth, for example, allocate some resources (such as a channel 1) to the relay to help a STA 2 forward data, collect first-type service data (such as an urgent report) associated with the STA 2, allocate some resources (such as a channel 2) to the STA 1 to transmit first-type service data (such as an urgent report) of the STA 1, and agree on an end time of parallel processing. In this way, after the end time of the parallel processing, the relay may forward the collected urgent report of the STA 1 to the AP by using the channel 1, and forward the urgent report of the STA 1 to the AP by using the channel 2. Alternatively, the relay and the STA 2 may simultaneously use, based on the OFDMA, the channel 2 to transmit the urgent report. In this way, transmission efficiency of the urgent report can be improved.

With reference to the first aspect and the foregoing implementations thereof, in another implementation of the first aspect, the first-type service data is an urgent report.

The first-type service data in this embodiment of this application may be a piece or a type of service data, for example, the urgent report, voice service data, and video service data.

According to a second aspect, a service data transmission method is provided, including: sending, by an access point AP, a control frame to a first station STA, where the control frame includes control information, and the control information is used to instruct the first STA to contend for a resource used to transmit first-type service data; and receiving, by the AP, the first-type service data of the first STA on the resource obtained by the first STA by contention.

In this embodiment of this application, the AP triggers a STA to perform a procedure of transmitting the first-type service data, and the STA sends the first-type service data to the AP on the resource obtained by contention. In this way, a contention delay can be reduced, and transmission efficiency can be improved.

With reference to the second aspect, in an implementation of the second aspect, the control information is a first association identifier AID, and the sending, by an AP, a control frame to a first STA includes: sending, by the AP, a trigger frame to the first STA, where the trigger frame carries the first AID.

With reference to the second aspect and the foregoing implementation thereof, in another implementation of the second aspect, a contention backoff window of the first STA is smaller than a contention backoff window of a second STA, and/or a backoff value of the first STA is less than a backoff value of the second STA, where the second STA is not configured to transmit the first-type service data.

With reference to the second aspect and the foregoing implementations thereof, in another implementation of the second aspect, the sending, by an AP, a control frame to a first STA includes: sending, by the AP to the first STA, an access frame configured by the AP, where the access frame includes a second AID and/or a restricted access window RAW control field, the second AID is used to instruct the first STA to contend for the resource used to transmit the first-type service data, and the RAW control field is used to indicate that a service data type of an access window is the first-type service data.

With reference to the second aspect and the foregoing implementations thereof, in another implementation of the second aspect, before the sending, by an AP, a control frame to a first STA, the method further includes: sending, by the AP, a multiple user request to send MU-RTS frame to the first STA, where the MU-RTS frame carries a third AID, and the third AID is used to indicate that the AP subsequently schedules the first STA to transmit the first-type service data; and receiving, by the AP, a clear to send CTS frame to the first STA.

With reference to the second aspect and the foregoing implementations thereof, in another implementation of the second aspect, before the sending, by an AP, a control frame to a first STA, the method further includes: sending, by the AP, a traffic indication map (TIM) to the first STA, where the TIM is used to indicate that the AP triggers the first STA to transmit the first-type service data in a current beacon frame period.

With reference to the second aspect and the foregoing implementations thereof, in another implementation of the second aspect, the first-type service data is an emergency service.

According to a third aspect, a service data transmission method is provided, including: obtaining, by an access point AP, a data packet, where the data packet includes resource indication information and broadcast information, the resource indication information includes a first AID, and the first AID is used to instruct, to read the broadcast information, a station STA participating in transmitting first-type service data; and sending, by the AP, the data packet to the STA.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

With reference to the third aspect, in an implementation of the third aspect, the method further includes: sending, by the AP, a traffic indication map TIM to the STA, where the TIM is used to indicate that the AP caches multicast information of the first-type service data in a current beacon frame period.

According to a fourth aspect, a service transmission method is provided, including: receiving, by a station STA, a data packet, where the data packet includes resource indication information and broadcast information, the resource indication information includes a first AID, and the first AID is used to instruct, to read the broadcast information, the STA participating in transmitting first-type service data; and reading, by the STA, the broadcast information based on the first AID.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

With reference to the fourth aspect, in an implementation of the fourth aspect, the method further includes: receiving, by the STA, a traffic indication map TIM, where the TIM is used to indicate that the AP caches multicast information of the first-type service data in a current beacon frame period.

According to a fifth aspect, a service data transmission method is provided, including: receiving, by a relay, a control frame, where the control frame includes control information, and the control information is used to instruct the relay to contend for a resource for transmitting first-type service data; contending, by the relay, for the resource based on the control frame, and sending a trigger frame to a first station STA associated with the relay; receiving, by the relay, the first-type service data that is of the first STA and that is sent by the first STA based on the trigger frame; and sending, by the relay, the first-type service data of the first STA to an access point AP on the resource obtained by contention.

The relay in this embodiment of this application may help a STA associated with the relay to transmit the first-type service data between the STA and the AP. In this way, long-distance transmission of the first-type service data can be implemented.

In an embodiment of this application, after receiving the control frame sent by the AP, the relay may forward the control frame to the STA. The STA may transmit the first-type service data based on the control frame.

With reference to the fifth aspect, in an implementation of the fifth aspect, the control information is a first association identifier AID, and the receiving, by a relay, a control frame includes: receiving, by the relay, the trigger frame.

In an embodiment of this application, the first-type service data may be an urgent report.

According to a sixth aspect, a service data transmission method is provided, including: sending, by an access point AP, a control frame to a relay, where the control frame includes control information, and the control information is used to instruct the relay to contend for a resource for transmitting first-type service data; and receiving, by the AP, the first-type service data of a first station STA sent by the relay.

The relay in this embodiment of this application may help a STA associated with the relay to transmit the first-type service data between the STA and the AP. In this way, long-distance transmission of the first-type service data can be implemented.

With reference to the sixth aspect, in an implementation of the sixth aspect, the control information is a first association identifier AID, and the sending, by an access point AP, a control frame to a relay includes: sending, by the AP, a trigger frame to the relay.

With reference to the sixth aspect and the foregoing implementation thereof, in another implementation of the sixth aspect, the method further includes: separately sending, by the AP, resource allocation information to the relay and a second STA, where the resource allocation information is used to instruct the relay and the second STA to separately transmit a resource of first-type service data to the AP, and the resource allocation information is further used to instruct the relay and the second STA to simultaneously transmit corresponding first-type service data to the AP; or the resource allocation information is used to instruct the relay and the second STA to contend for the resource in an orthogonal frequency division multiple access OFDMA manner, and transmit the corresponding first-type service data to the AP.

In an embodiment of this application, the first-type service data may be an urgent report.

According to a seventh aspect, a station STA is provided, including: a first receiving unit, configured to receive a control frame, where the control frame includes control information, and the control information is used to instruct the STA to contend for a resource used to transmit first-type service data; a contention unit, configured to contend for the resource based on the control information received by the first receiving unit; and a first sending unit, configured to send the first-type service data of the STA to an access point AP on the resource obtained by the contention unit by contention.

In this embodiment of this application, the AP triggers the STA to perform a procedure of transmitting the first-type service data, and the STA sends the first-type service data to the AP on the resource obtained by contention. In this way, a contention delay can be reduced, and transmission efficiency can be improved.

With reference to the seventh aspect, in an implementation of the seventh aspect, the control information is a first association identifier AID, the first receiving unit is specifically configured to receive a trigger frame, and the trigger frame carries the first AID.

With reference to the seventh aspect and the foregoing implementation thereof, in another implementation of the seventh aspect, the first AID is used to instruct the STA to randomly contend for the resource based on orthogonal frequency division multiple access OFDMA, and the contention unit is specifically configured to randomly contend for the resource based on the OFDMA.

With reference to the seventh aspect and the foregoing implementations thereof, in another implementation of the seventh aspect, a contention backoff window of the STA is smaller than a contention backoff window of a second STA, and/or a backoff value of the STA is less than a backoff value of the second STA, where the second STA is not configured to transmit the first-type service data.

With reference to the seventh aspect and the foregoing implementations thereof, in another implementation of the seventh aspect, the first receiving unit is specifically configured to receive an access frame configured by the AP, the access frame includes a second AID and/or a restricted access window RAW control field, the second AID is used to instruct the STA to contend for the resource used to transmit the first-type service data, and the RAW control field is used to indicate that a service data type of an access window is the first-type service data.

With reference to the seventh aspect and the foregoing implementations thereof, in another implementation of the seventh aspect, the STA further includes: a second receiving unit, configured to receive a multiple user request to send MU-RTS frame, where the MU-RTS frame carries a third AID, and the third AID is used to indicate that the AP subsequently schedules the STA to transmit the first-type service data; and a second sending unit, configured to send a clear to send CTS frame to the AP.

With reference to the seventh aspect and the foregoing implementations thereof, in another implementation of the seventh aspect, the STA further includes: a third receiving unit, configured to receive a traffic indication map TIM, where the TIM is used to indicate that the AP triggers the first STA to transmit the first-type service data in a current beacon frame period.

With reference to the seventh aspect and the foregoing implementations thereof, in another implementation of the seventh aspect, the STA further includes: a fourth receiving unit, configured to receive requirement information sent by a third STA, where the requirement information includes a fourth AID, and the fourth AID is used to indicate a requirement that the third STA transmits first-type service data or indicate a size of the first-type service data of the third STA that needs to be transmitted by the third STA; and a third sending unit, configured to send, to the AP on the resource obtained by contention, the requirement that the third STA transmits the first-type service data or the size of the first-type service data of the third STA.

With reference to the seventh aspect and the foregoing implementations thereof, in another implementation of the seventh aspect, the fourth AID is carried in a high efficient aggregated control field of a frame carrying the requirement information.

With reference to the seventh aspect and the foregoing implementations thereof, in another implementation of the seventh aspect, the first-type service data is an urgent report.

The station in the seventh aspect in this embodiment of this application may be of the service data transmission method in the first aspect of the method embodiment of this application. In addition, the units/modules in the station and the foregoing other operations and/or functions are respectively intended to implement corresponding procedures of the first STA in the method shown in the first aspect. For brevity, details are not repeated herein.

According to an eighth aspect, an access point AP is provided, including: a first sending unit, configured to send a control frame to a first station STA, where the control frame includes control information, and the control information is used to instruct the first STA to contend for a resource used to transmit first-type service data; and a first receiving unit, configured to receive the first-type service data of the first STA on the resource obtained by the first STA by contention.

In this embodiment of this application, the AP triggers the STA to perform a procedure of transmitting the first-type service data, and the STA sends the first-type service data to the AP on the resource obtained by contention. In this way, a contention delay can be reduced, and transmission efficiency can be improved.

With reference to the eighth aspect, in an implementation of the eighth aspect, the control information is a first association identifier AID, the first sending unit is specifically configured to send a trigger frame to the first STA, and the trigger frame carries the first AID.

With reference to the eighth aspect and the foregoing implementation thereof, in another implementation of the seventh aspect, a contention backoff window of the first STA is smaller than a contention backoff window of a second STA, and/or a backoff value of the first STA is less than a backoff value of the second STA, where the second STA is not configured to transmit the first-type service data.

With reference to the eighth aspect and the foregoing implementations thereof, in another implementation of the seventh aspect, the first sending unit is specifically configured to send, to the first STA, an access frame configured by the AP, the access frame includes a second AID and/or a restricted access window RAW control field, the second AID is used to instruct the first STA to contend for the resource used to transmit the first-type service data, and the RAW control field is used to indicate that a service data type of an access window is the first-type service data.

With reference to the eighth aspect and the foregoing implementations thereof, in another implementation of the seventh aspect, the AP further includes: a second sending unit, configured to send a multiple user request to send MU-RTS frame to the first STA, where the MU-RTS frame carries a third AID, and the third AID is used to indicate that the AP subsequently schedules the first STA to transmit the first-type service data; and a second receiving unit, configured to receive a clear to send CTS frame sent by the first STA.

With reference to the eighth aspect and the foregoing implementations thereof, in another implementation of the seventh aspect, the AP further includes: a third sending unit, configured to send a traffic indication map TIM to the first STA, where the TIM is used to indicate that the AP triggers the first STA to transmit the first-type service data in a current beacon frame period.

With reference to the eighth aspect and the foregoing implementations thereof, in another implementation of the seventh aspect, the first-type service data is an emergency service.

The access point in the eighth aspect in this embodiment of this application may be of the service data transmission method in the second aspect of the method embodiment of this application. In addition, the units/modules in the access point and the foregoing other operations and/or functions are respectively intended to implement corresponding procedures of the access point AP in the method shown in the second aspect. For brevity, details are not repeated herein.

According to a ninth aspect, an access point AP is provided, including: an obtaining unit, configured to obtain a data packet, where the data packet includes resource indication information and broadcast information, the resource indication information includes a first AID, and the first AID is used to instruct, to read the broadcast information, a station STA participating in transmitting first-type service data; and a first sending unit, configured to send, to the STA, the data packet obtained by the obtaining unit.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

With reference to the ninth aspect, in an implementation of the ninth aspect, the AP further includes: a second sending unit, configured to send a traffic indication map TIM to the STA, where the TIM is used to indicate that the AP caches multicast information of the first-type service data in a current beacon frame period.

The access point in the ninth aspect in this embodiment of this application may be of the service data transmission method in the third aspect of the method embodiment of this application. In addition, the units/modules in the access point and the foregoing other operations and/or functions are respectively intended to implement corresponding procedures of the access point in the method shown in the third aspect. For brevity, details are not repeated herein.

According to a tenth aspect, a station STA is provided, including: a first receiving unit, configured to receive a data packet, where the data packet includes resource indication information and broadcast information, the resource indication information includes a first AID, and the first AID is used to instruct, to read the broadcast information, the STA participating in transmitting first-type service data; and a data reading unit, configured to read the broadcast information based on the first AID in the data packet received by the first receiving unit.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

With reference to the tenth aspect, in an implementation of the tenth aspect, the STA further includes: a second receiving unit, configured to receive a traffic indication map TIM, where the TIM is used to indicate that the AP caches multicast information of the first-type service data in a current beacon frame period.

The station in the tenth aspect in this embodiment of this application may be of the service data transmission method in the fourth aspect of the method embodiment of this application. In addition, the units/modules in the STA and the foregoing other operations and/or functions are respectively intended to implement corresponding procedures of the station STA in the method shown in the fourth aspect. For brevity, details are not repeated herein.

According to an eleventh aspect, a relay is provided, including: a first receiving unit, configured to receive a control frame, where the control frame includes control information, and the control information is used to instruct the relay to contend for a resource for transmitting first-type service data; a first sending unit, configured to contend for the resource based on the control frame, and send the trigger frame to a first station STA associated with the relay; a second receiving unit, configured to receive the first-type service data that is of the first STA and that is sent by the first STA based on the trigger frame; and a second sending unit, configured to send the first-type service data of the first STA to an access point AP on the resource obtained by contention.

The relay in this embodiment of this application may help a STA associated with the relay to transmit the first-type service data between the STA and the AP. In this way, long-distance transmission of the first-type service data can be implemented.

With reference to the eleventh aspect, in an implementation of the eleventh aspect, the control information is a first association identifier AID, and the first receiving unit is specifically configured to receive the trigger frame.

The relay in the eleventh aspect in this embodiment of this application may be of the service data transmission method in the fifth aspect of the method embodiment of this application. In addition, the units/modules in the relay and the foregoing other operations and/or functions are respectively intended to implement corresponding procedures performed by the relay in the method shown in the fifth aspect. For brevity, details are not repeated herein.

According to a twelfth aspect, an access point is provided, including: a first sending unit, configured to send a control frame to a relay, where the control frame includes control information, and the control information is used to instruct the relay to contend for a resource for transmitting first-type service data; and a first receiving unit, configured to receive the first-type service data of a first station STA sent by the relay.

The relay in this embodiment of this application may help a STA associated with the relay to transmit the first-type service data between the STA and the AP. In this way, long-distance transmission of the first-type service data can be implemented.

With reference to the twelfth aspect, in an implementation of the twelfth aspect, the control information is a first association identifier AID, and the sending unit is specifically configured to send a trigger frame to the relay.

With reference to the twelfth aspect and the foregoing implementation thereof, in another implementation of the twelfth aspect, a second sending unit is configured to separately send resource allocation information to the relay and a second STA, where the resource allocation information is used to instruct the relay and the second STA to separately transmit a resource of first-type service data to the AP, and the resource allocation information is further used to instruct the relay and the second STA to simultaneously transmit corresponding first-type service data to the AP; or the resource allocation information is used to instruct the relay and the second STA to contend for the resource in an orthogonal frequency division multiple access OFDMA manner, and transmit the corresponding first-type service data to the AP.

The access point in the twelfth aspect in this embodiment of this application may be of the service data transmission method in the sixth aspect of the method embodiment of this application. In addition, the units/modules in the access point and the foregoing other operations and/or functions are respectively intended to implement corresponding procedures of the access point in the method shown in the sixth aspect. For brevity, details are not repeated herein.

BRIEF DESCRIPTION OF THE DRAWINGS

FIG. 7 is a schematic structural diagram of a frame that carries an emergency access window information element according to an embodiment of this application;

FIG. 8 is a schematic diagram of instructing to trigger urgent report transmission by using a TIM carried in a beacon frame according to an embodiment of this application;

DETAILED DESCRIPTION

The following describes technical solutions of this application with reference to accompanying drawings.

It should be understood that, the technical solutions of the embodiments of this application may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), Universal Mobile Telecommunications System (UMTS), and a Worldwide Interoperability for Microwave Access (WiMAX) communications system.

It should also be understood that in the embodiments of this application, a station may be a station (STA), a terminal, a mobile station (MS), a mobile terminal, or the like that supports a WLAN communications protocol. The station may communicate with one or more core networks by using a radio access network (RAN). For example, the station may be a mobile phone (also referred to as a "cellular" phone) or a computer having a mobile terminal. For example, the station may further be a portable, pocket-sized, handheld, computer built-in, or in-vehicle mobile apparatus, which exchanges voice and/or data with the radio access network.

It should also be understood that, in the embodiments of this application, an AP may provide an access service to the station, the AP may be an access point in a WLAN, or may be a base transceiver station (BTS) in GSM or CDMA, or may be a NodeB in WCDMA, or may be an evolved NodeB (eNB or "e-NodeB") in LTE. This is not limited in this application.

In the embodiments of this application, only a wireless local area network (WLAN) system is used as an example for description. However, this application is not limited thereto. A method and an apparatus according to the embodiments of this application may be further applied to another communications system. Similarly, only the AP and the STA in the WLAN system are also used as an example for description in the embodiments of this application. However, this application is not limited thereto. The method and the apparatus according to the embodiments of this application may be further applied to a base station and user equipment in the other communications system.

Figure 1:
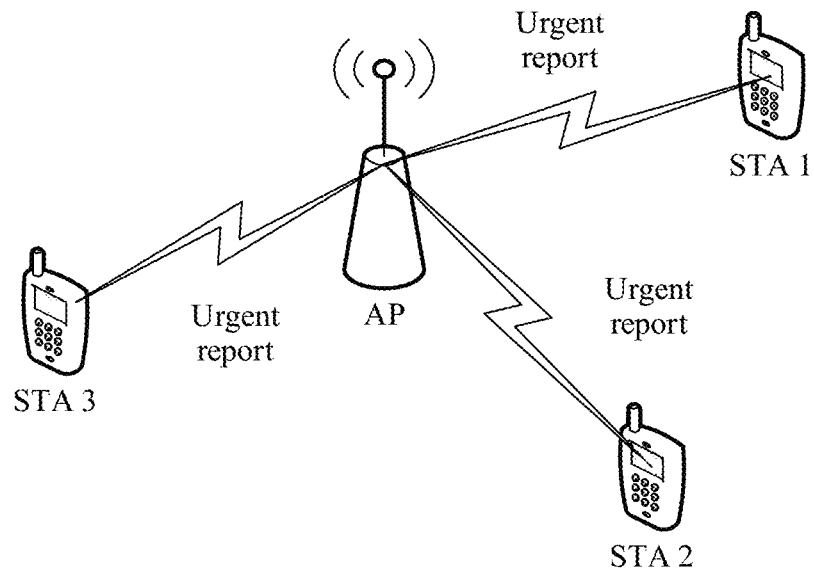
FIG. 1 is a schematic diagram of a scenario of a communications system that may be applied to an embodiment of this application.
Figure 2:
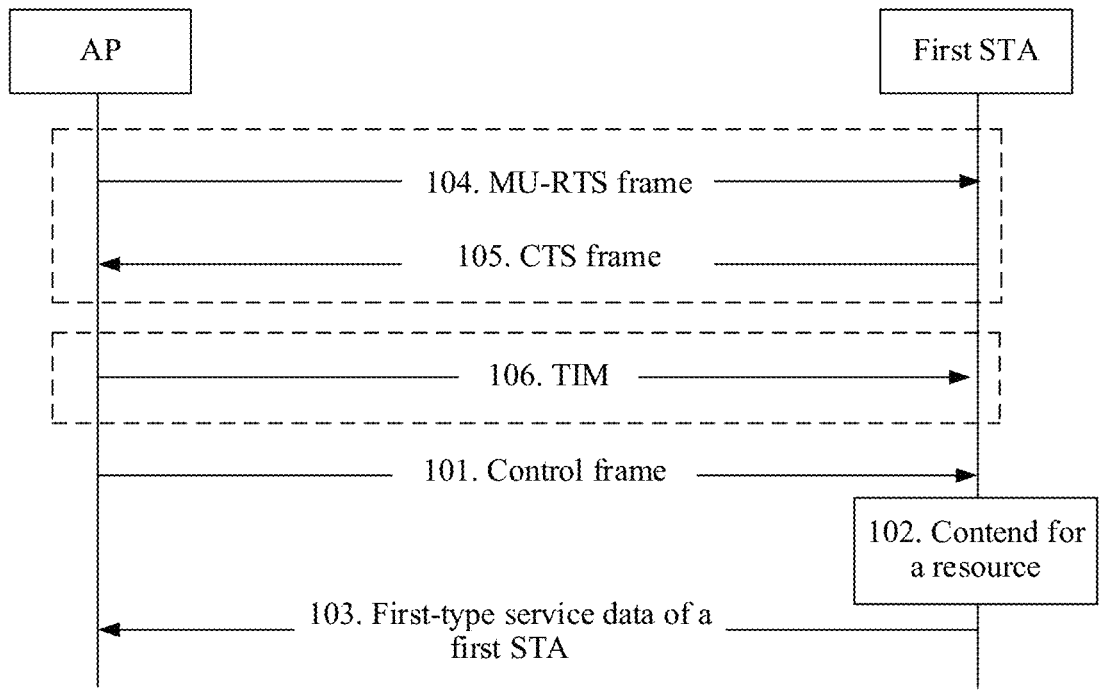
FIG. 2 is a schematic flowchart of a service data transmission method according to an embodiment of this application.

FIG. 2 is a schematic flowchart of a service data transmission method according to an embodiment of this application. In this embodiment of this application, an example in which transmitted first-type service data is an urgent report is used for description.

101. An AP sends a control frame to a first STA, and the first STA receives the control frame sent by the AP.

The AP sends the control frame to the first STA, the control frame includes control information, and the control information is used to instruct the first STA to contend for a resource used to transmit first-type service data. The first-type service data herein may be the urgent report, video service data, audio service data, or the like.

In an embodiment of this application, the control frame may be a trigger frame TF-R, the control information is a first AID (such as 301 in FIG. 3), and the control frame carries the first AID. A schematic diagram of a frame structure of the trigger frame is shown in FIG. 4.

The first AID, a second AID, a third AID, and a fourth AID in this embodiment of this application may be represented by using an AID X. X is a number including bits of a corresponding AID. Any two Xs in the first AID, the second AID, the third AID, and the fourth AID may be a same value, or may be different values, and this is not limited in this embodiment of this application.

In an embodiment of this application, the AID X is used to instruct to contend for the resource for transmitting the first-type service data, and X is the number including the bits of the AID. In particular, the AID X may be further used to instruct a STA to randomly contend for the resource based on OFDMA.

In the current 802.11 standard, AIDs 1 to 2007 may be used, and AIDs 2008 to 2047 are reserved AIDs. In an embodiment of this application, one reserved AID may be stipulated in the standard and instructs, to perform OFDMA random contention, the STA configured to transmit the first-type service data.

In an embodiment of this application, one AID may be selected from the AIDs 1 to 2007 in the standard and is used to instruct the STA to transmit the first-type service data in an OFDMA-based random contention manner. For example, an AID 911 is used in the United States, and an AID 110 is used in China. In this case, it may be stipulated that the AP is not allowed to allocate the AID to a specific STA.

In an embodiment of this application, the AP may select one AID, used to instruct the STA to transmit the first-type service data in the OFDMA-based random contention manner, from the AIDs 1 to 2007, and perform broadcasting in a beacon frame by using an information element (IE). In this case, it may be stipulated that the AP is not allowed to allocate, to a specific STA, the AID X broadcast by the AP.

In an embodiment of this application, the trigger frame may further include resource scheduling information of the STA, and the AP may perform resource scheduling by using the resource scheduling information.

Figure 6:
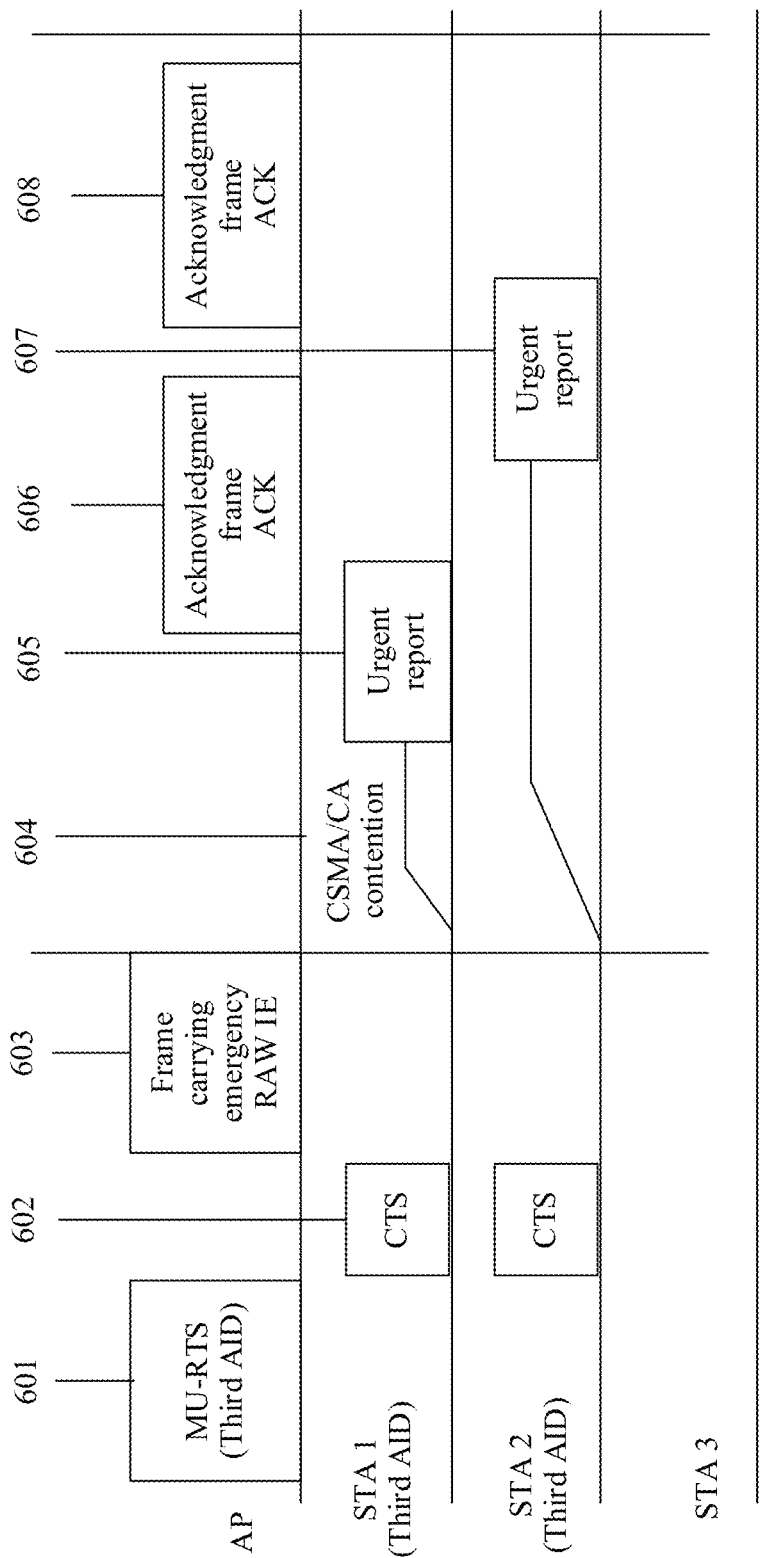
FIG. 6 a diagram of establishing a transmission opportunity for an urgent report by using an AID (such as a third AID) carried in an MU-RTS frame according to another embodiment of this application.

In another embodiment of this application, the control frame may be a frame carrying an emergency restricted access window (RAW) IE, as shown in step 603 in FIG. 6. A schematic structural diagram of a frame carrying the emergency RAW IE is shown in FIG. 7, and the frame carrying the emergency RAW IE may include at least one of the second AID or an RAW control field. The second AID is used to instruct the first STA to contend for the resource used to transmit the first-type service data, and the RAW control field is used to indicate that a service data type of an access window is the first-type service data.

The AP may send the control frame to the first STA in a broadcast or multicast form, or in a unicast form.

102. The first STA contends for a resource based on the received control frame.

Figure 3:
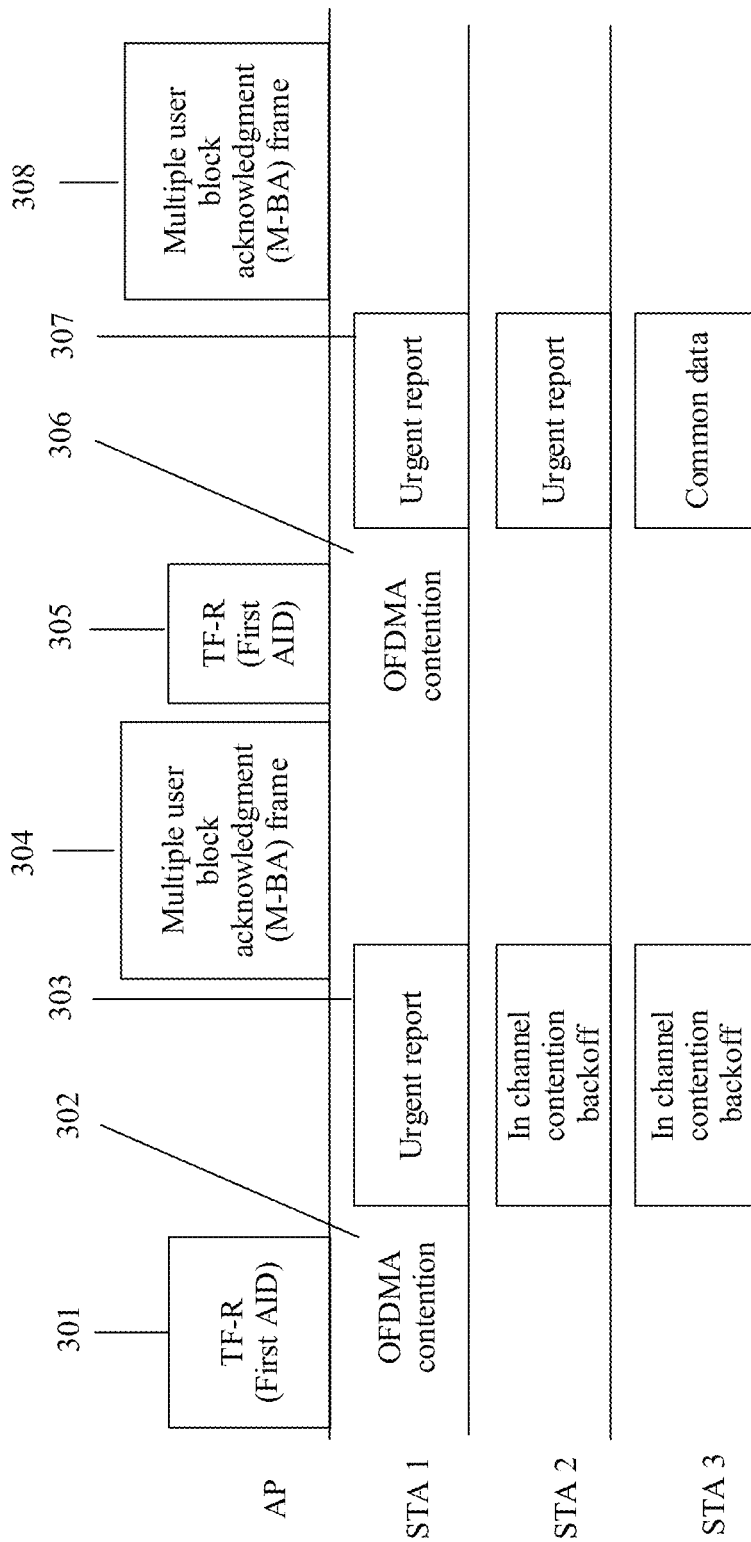
FIG. 3 is a schematic diagram of triggering urgent report transmission by using an AID (such as a first AID) carried in a trigger frame TF-R according to an embodiment of this application.
Figure 4:
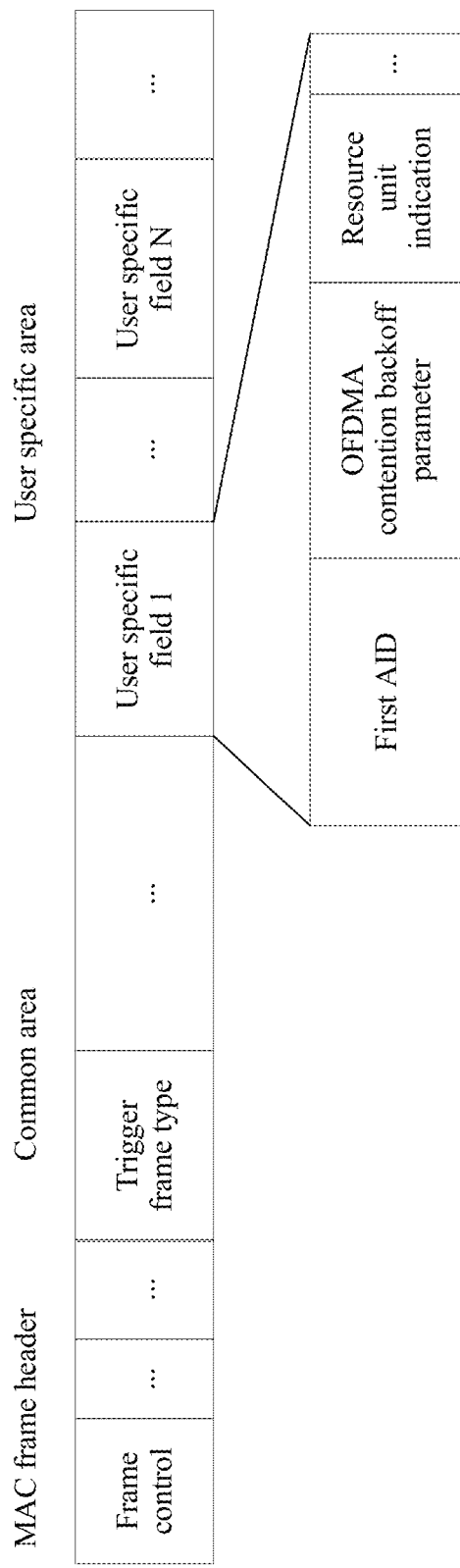
FIG. 4 is a schematic diagram of a frame structure of a trigger frame that includes an AID (such as a first AID) according to an embodiment of this application.

The first STA receives the control frame, and may contend for the resource based on the received control frame, as shown in step 302 in FIG. 3. Specifically, the STA may contend for a channel used to transmit the first-type service data, and so on.

The AP and the STA may agree on a correspondence between an AID and a contention manner. For example, it is agreed that an AID 811 is used to instruct a STA that has a first-type service data transmission requirement to contend for the resource in a random contention manner and transmit the first-type service data. The STA receives the control frame, and when the control frame carries the AID 811, the STA may contend, in a random contention manner, for the resource with another STA that needs to transmit the first-type service data.

For another example, it may be agreed that an AID 711 is used to instruct the STA that has the first-type service data transmission requirement to contend for the resource in an OFDMA-based contention manner with the another STA and transmit the first-type service data. When receiving the control frame and detecting that the control frame carries the AID 711, the STA may contend for the transmission resource in the OFDMA-based random contention manner.

In an embodiment of this application, a contention backoff window of the first STA is smaller than a contention backoff window of a second STA, and/or a backoff value of the first STA is less than a backoff value of the second STA, where the second STA is not configured to transmit the first-type service data, and the first STA is configured to transmit the first-type service data. In other words, a backoff value and a backoff window of the STA that transmits the first-type service data may be reduced. Alternatively, a backoff value and a backoff window of the STA that transmits the first-type service data may be kept unchanged, and a backoff value and a backoff window of a common STA that transmits non-first-type service data may be increased. In this way, contention for the first-type service data may be accelerated.

In OFDMA-based random contention, the STA first randomly selects one backoff value from an initial backoff window, and at the same time, the STA reads a quantity of resource units, indicated in the trigger frame, that are used for random contention. When the backoff value is greater than the quantity of the resource units, transmission cannot be performed this time, and the backoff value minus the quantity of the resource units is used as a backoff value of next OFDMA contention. If the backoff value is less than the quantity of the resource units, one resource unit is randomly selected from the resource units used for random contention, to perform data communication. If a transmission opportunity is obtained but transmission fails, the contention backoff window needs to be expanded, and one backoff value is randomly selected again, and the contention continues. Therefore, it is stipulated in the foregoing that the contention backoff window of the first STA is smaller than the contention backoff window of the second STA, and/or the backoff value of the first STA is less than the backoff value of the second STA. This may help the first STA more quickly contend for and obtain the resource used to transmit the first-type service data.

103. The first STA sends first-type service data of the first STA to the AP, and the AP receives the first-type service data of the first STA sent by the first STA.

When obtaining the resource by contention, the first STA may send, by using the resource obtained by contention, the first-type service data of the first STA to the AP. For example, an example in which the first-type service data is an urgent report is used for description in FIG. 4. When receiving the urgent report sent by the STA, the AP may further send a multiple user block acknowledgment (M-BA) frame to the STA, or may use another acknowledgment manner, for example, send an acknowledgment (ACK) frame and a block acknowledgment (BA) frame to each STA in sequence, or simultaneously send the ACK/BA frame to a plurality of STAs in an OFDMA manner.

For a procedure of triggering urgent report transmission by using the trigger frame in step 101 to step 103, refer to the schematic diagram shown in FIG. 3. For the frame structure of the trigger frame, refer to the schematic structural diagram shown in FIG. 4.

Figure 9:
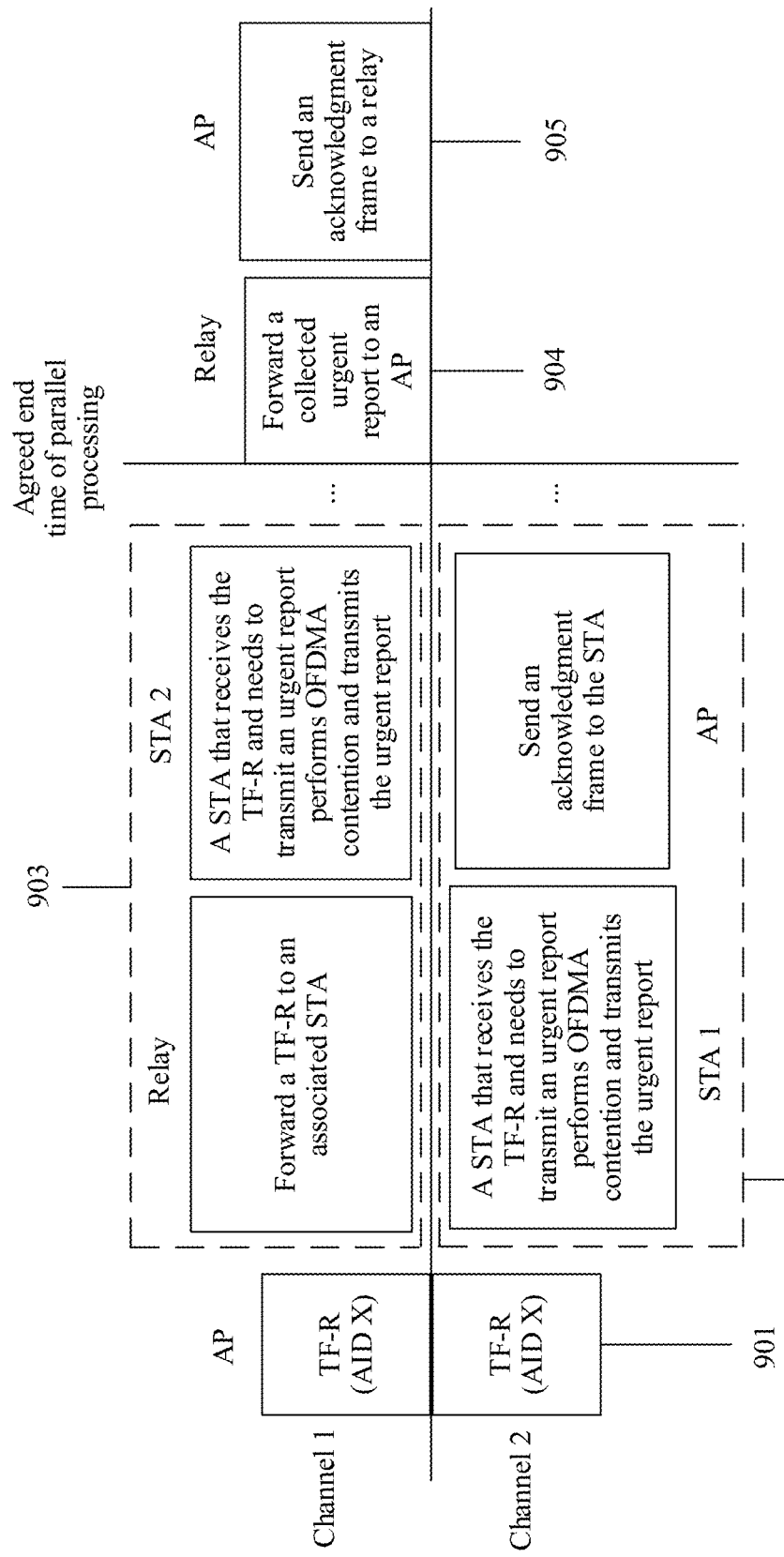
FIG. 9 is a schematic diagram of transmitting an urgent report by using a relay according to an embodiment of this application.

Some service data requires relatively high delay sensitivity, for example, the urgent report. For some long-distance transmission, service data may be forwarded with the help of a relay. For example, in an embodiment of this application, in the foregoing step 101, the AP may send the control frame to the first STA by using the relay, and the first STA receives, by using the relay, the control frame sent by the AP. In step 103, the first STA may send, by using the relay, the first-type service data of the first STA, and the AP receives, by using the relay, the first-type service data of the first STA sent by the first STA. To reduce a delay caused by the relay, the AP may further transmit the control frame to the relay, and simultaneously send the control frame to the other STA (such as a STA 1). When sending the control frame to the STA 1 and the relay, the AP may perform resource allocation for an entire transmission bandwidth, and agree on an end time of parallel processing for different allocated resources. In this way, transmission efficiency of the urgent report can be improved, as shown in FIG. 9.

104. The AP sends an MU-RTS frame to the first STA, and the first STA receives the MU-RTS frame sent by the AP.

In an embodiment of this application, all STAs may be set with a network allocation vector (Network Allocation Vector, NAV), and the NAV may also be referred to as virtual carrier sense. Carrier sense multiple access with collision avoidance (CSMA/CA) is based on carrier sense (CS). A distributed coordination function (DCF) determines a media status by simultaneously using physical carrier sense and the virtual carrier sense. A channel is considered as idle only when both a physical carrier sense mechanism and a virtual carrier sense mechanism consider that the channel is idle. If only the physical carrier sense mechanism or the virtual carrier sense mechanism considers that the channel is idle, the channel is considered as busy. The virtual carrier sense may declare exclusive access to media. A result of performing the virtual carrier sense by a STA that is set with the NAV is always busy. To be specific, the STA that is set with the NAV does not actively contend for the channel, and the AP may set an NAV within a specific range and establish the transmission opportunity (TXOP). In a TXOP time limit, some STAs may exclusively occupy a media resource, and send a single or a plurality of data frames, management frames, and control frame. In this way, in specified duration, data transmission cannot be actively performed between the AP and a silent STA. The AP may transmit uplink data by scheduling one STA, or may transmit uplink multi-user data by scheduling the plurality of the STAs.

Figure 5:
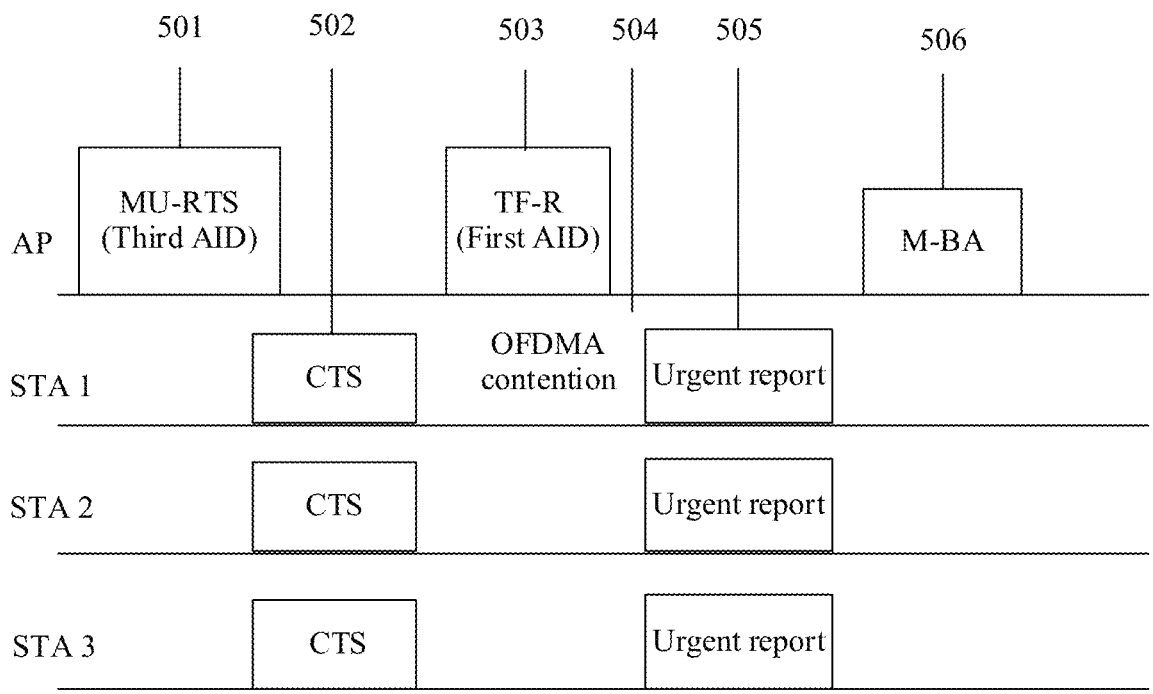
FIG. 5 is a diagram of establishing a transmission opportunity for an urgent report by using an AID (such as a third AID) carried in an MU-RTS frame according to an embodiment of this application.

For example, before the first STA receives the control frame in step 101, the first STA may further receive the MU-RTS frame sent by the AP, as shown in FIG. 5 and FIG. 6, so as to schedule transmission of the uplink data. The MU-RTS frame carries the third AID, and the third AID is used to indicate that the AP subsequently schedules the first STA to transmit the first-type service data. In this way, after receiving the MU-RTS frame, the STA knows that there is the first-type service data to be transmitted. Then, the STA may be triggered to start a procedure of transmitting the first-type service data, the other station may be further caused to no longer contend for the resource, and the transmission opportunity is reserved in advance to transmit the first-type service data for the station requested by the AP, so as to improve transmission efficiency.

For another example, before the first STA receives the control frame in step 101, the AP may further notify the STA in a manner shown in step 106 to prepare to transmit the first-type service data, so as to schedule transmission of the uplink data.

An example in which the first-type service data is an urgent report is used. The MU-RTS frame carries the third AID, and there are two cases. In a first case, an AID carried in the MU-RTS frame includes only the third AID, and does not include another AID, to be specific, the MU-RTS frame includes only the AID whose value including bits is a specified value. In a second case, the MU-RTS frame includes both the third AID and another AID, and herein, a value including bits of the other AID is different from a value including bits of the third AID.

For either of the foregoing cases, when the MU-RTS carries the third AID, all the STAs learn that a subsequent TXOP schedules an emergency service. For this type of TXOP, a special rule may be defined, for example, that an AP and a STA in another basic service set (BSS) are not allowed to perform spatial multiplexing may be defined. Although the spatial multiplexing improves transmission efficiency of an entire system, the spatial multiplexing also affects urgent report transmission of a current basic service set. The urgent report transmission of the current basic service set may be ensured by defining that the AP and the STA in the other BSS are not allowed to perform spatial multiplexing. For another example, it may be further defined that in the subsequent TXOP, there is an interval that can be contended for only by the STA needing to transmit the urgent report. For another example, that in the subsequent TXOP, when OFDMA contention is performed, the backoff window and the backoff value of the STA that needs to transmit the urgent report are reduced may be defined, and the backoff window of the common STA without the urgent report is increased. In this way, transmission efficiency can be improved.

105. The first STA feeds back a CTS frame to the AP, and the AP receives the CTS frame fed back by the first STA.

After receiving the MU-RTS frame, if there is first-type service data to be transmitted, the STA may feed back the CTS frame to the AP, as shown in FIG. 5 and FIG. 6. In an embodiment of this application, the first STA (such as the STA 1 in FIG. 5 and FIG. 6) and the another STA that needs to transmit the first-type service data (such as the STA 2 and the STA 3 in FIG. 5 and FIG. 6) may receive the MU-RTS frame sent by the AP, and the STA that receives the MU-RTS frame and needs to transmit the first-type service data may send a synchronous CTS frame to the AP, to be specific, the plurality of the STAs simultaneously send a CTS frame to the AP, and physical layer structures of CTS frames sent by the STAs are the same.

For the two cases in which the MU-RTS frame carries the third AID in step 104:

In the first case, the AID carried in the MU-RTS frame includes only the third AID, and does not include the other AID, to be specific, the MU-RTS frame includes only the AID whose value including the bits is the specified value. When the AP sends the MU-RTS frame carrying the third AID, only the STA that needs the urgent report feeds back the CTS frame to the AP. When receiving the CTS frame, the AP learns that the STA has a requirement for transmitting the urgent report.

In the second case, the MU-RTS frame includes both the third AID and the other AID, and herein, the value including the bits of the another AID is different from the value including the bits of the third AID. When the AP sends the MU-RTS frame that carries the third AID and the other AID, the STA that has the urgent report transmission requirement and a specified STA return the CTS frame. The AP receives the CTS frame. However, the AP does not know whether there is a CTS sent by the STA that has the urgent report transmission requirement. An advantage of this method is that the AP can protect a TXOP that allows simultaneous transmission of the urgent report and common data.

In an embodiment of this application, the first STA and the another STA that needs to transmit the first-type service data (such as the STA 2 and the STA 3 in FIG. 5 and FIG. 6) may receive the MU-RTS frame sent by the AP, and the STA that receives the MU-RTS frame and needs to transmit the first-type service data may send the synchronous CTS frame to the AP, to be specific, the plurality of the STAs simultaneously send the CTS frame to the AP, and the physical layer structures of the CTS frames sent by the STAs are the same.

106. The AP sends a TIM to the first STA, and the first STA receives the TIM sent by the AP.

Before the first STA receives the control frame in step 101, the AP may further notify the STA in the following manner to prepare to transmit the first-type service data. For example, the AP may send a beacon frame to the first STA, the beacon frame includes the TIM, and the TIM is used to indicate that the AP triggers the first STA to transmit the first-type service data in a current beacon frame period. The TIM may be used by the AP to notify the STA in advance to prepare to transmit the first-type service data. Specifically, the TIM may notify, in advance, the STA that prepares to transmit the first-type service data to be no longer hibernated or to be in a wakeup state. In this way, a transmission delay of transmitting the first-type service data may be reduced, and transmission efficiency can be improved.

Due to a channel status or a distance restriction, some STAs (such as a third STA) have a requirement for transmitting the first-type service data, but cannot transmit corresponding first-type service data to the AP. In this case, another surrounding STA (such as the first STA) may be used to help forward the transmission requirement or cache information, for example, a size of cache data. For example, the third STA may send requirement information to the first STA, and the first STA may receive the requirement information sent by the third STA. The requirement information includes the fourth AID, and the fourth AID is used to indicate the transmission requirement of the third STA for transmitting the first-type service data, or the fourth AID is used to indicate a size of the first-type service data of the third STA that needs to be transmitted by the third STA. In this way, when the first STA transmits the first-type service data of the first STA on the resource obtained by contention, the first STA may further transmit, to the AP by using the resource obtained by contention, the transmission requirement of the third STA for transmitting the first-type service data or transmit the size of the first-type service data of the third STA to the AP. In other words, the first STA may help a surrounding STA (such as the third STA) that cannot transmit the corresponding first-type service data send the requirement information to the AP. In this way, when learning that the third STA has the requirement for transmitting the first-type service data, the AP may trigger, by sending the trigger frame to the third STA, the STA to report a procedure of transmitting the first-type service data, and may also cause the third STA to report the first-type service data to the AP by using a relay or in a similar manner.

The requirement information that is sent by the third STA to the first STA may be sent in a broadcast or unicast form, and this is not limited in this embodiment of this application.

Figure 10:
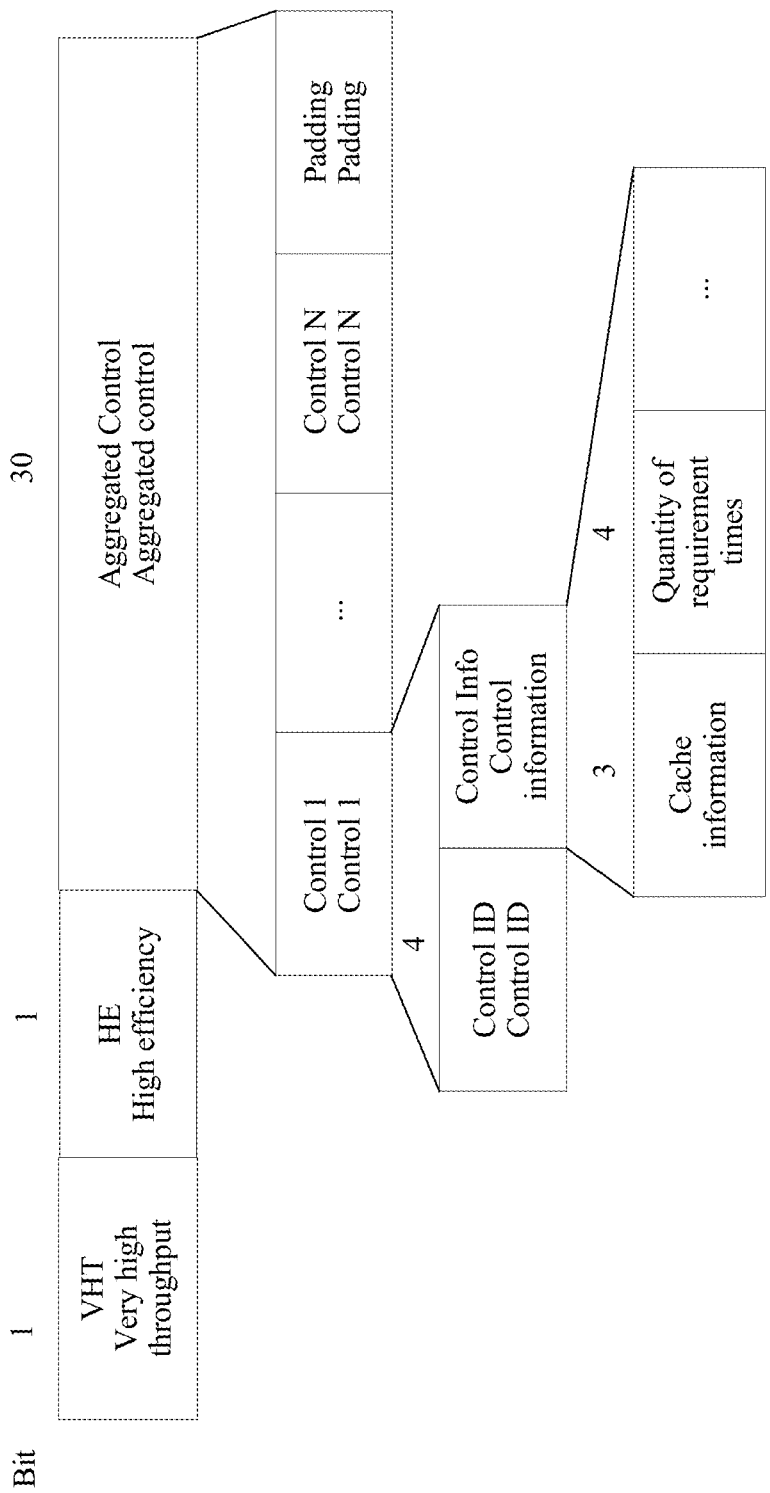
FIG. 10 is a schematic structural diagram of a frame that uses HE-A-Control to carry cache information of an AID (such as a fourth AID) according to an embodiment of this application.

In an embodiment of this application, a high efficient aggregated control (HE-A-Control) field in a high throughput control field of a frame header in a Media Access Control (MAC) frame may be used to carry the fourth AID in the requirement information, as shown in FIG. 10.

The first STA in this embodiment of this application may be any STA that has a first-type service data transmission requirement with the AP.

It should be understood that in the embodiments of this application, sequence numbers of the foregoing processes do not mean execution sequences. The execution sequences of the processes should be determined based on functions and internal logic of the processes, and should not be construed as any limitation on the implementation processes of the embodiments of this application. For example, step 104 and step 105 may be performed before step 101, as shown in FIG. 5. Step 106 may be performed before step 101, as shown in FIG. 8.

In an embodiment of this application, steps 104, 105, and 106 are optional steps. In addition, step 104, step 105, and step 106 may have a function of notifying the STA in advance. Therefore, step 104, step 105, and step 106 may be optional in parallel. In an embodiment of this application, step 104 and step 105 may be selected and used to notify the STA in advance, or step 106 may be selected and used to notify the STA in advance, or the STA may not be notified in advance, and step 101 to step 103 are performed.

FIG. 3 is a schematic diagram of triggering urgent report transmission by using an AID (such as a first AID) carried in a trigger frame TF-R according to an embodiment of this application. An example in which one AP and three STAs: a STA 1, a STA 2, and a STA 3 are drawn is used for description in FIG. 3.

301. An AP sends a TF-R frame to a plurality of STAs, and the TF-R frame includes a first AID field and a resource unit indication field. The resource unit indication field is used to indicate a resource for transmitting an urgent report. The first AID is used to indicate that the resource indicated by the corresponding resource unit indication field is a resource that is contended, based on OFDMA, for by the plurality of the STAs to transmit the urgent report. A schematic diagram of a frame structure of the TF-R frame is shown in FIG. 4.

302. The plurality of the STAs contend, based on the OFDMA, for the resource used to transmit the urgent report.

In FIG. 3, it is assumed that the STA 1 and the STA 2 need to transmit the urgent report, and the STA 3 needs to transmit only common data. When three STAs receive the trigger frame sent by the AP, only the STA 1 and the STA 2 contend for the resource used to transmit the urgent report. The STA 3 contends for only a resource used to transmit the common data. The STA 1 and the STA 2 may simultaneously contend for the resource used to transmit the urgent report and the resource used to transmit the common data. In this way, the resource can be more quickly obtained by contention.

After the STA receives the TF-R frame, based on a quantity of resource units that may be used for random contention in the TF-R frame and a backoff value of the STA, if the backoff value is greater than the quantity of the resource units, transmission cannot be performed this time, and the STA enters contention channel backoff like the STA 2 and the current backoff value minus the quantity of the resource units is used as a backoff value of next OFDMA contention. If the backoff value is less than or equal to the quantity of the resource units, the STA randomly selects one resource unit from the resource units that may be used for random contention, to transmit the urgent report, for example, the STA 1.

303. When obtaining the resource by contention, a STA 1 transmits an urgent report to the AP by using the resource obtained by contention.

A random backoff time and a random backoff value of a STA (such as the STA 2) that has an urgent report transmission requirement are less than a random backoff time and a random backoff value of a STA (such as the STA 3) that does not have the urgent report.

When both the STA 1 and the STA 2 obtain a channel by contention, the STA 1 and the STA 2 may simultaneously transmit their respective urgent reports to the AP in a frequency division multiplexing manner, and when obtaining a channel by contention, the STA 3 may transmit the common data by using the channel obtained by contention, as shown in step 307 in FIG. 3.

304. When receiving the urgent report sent by the STA 1, the AP transmits M-BA to the STA 1, indicating that receiving of the urgent report of the STA 1 has been acknowledged.

Subsequent step 305 to step 308 are the same as or similar to step 301 to step 304 in one-to-one correspondence. To avoid repetition, details are not described herein again.

FIG. 4 is a schematic diagram of a frame structure of a trigger frame that includes an AID (such as a first AID) according to an embodiment of this application. The trigger frame in FIG. 4 includes a MAC frame header, a common area, and a user specific area. The MAC frame header includes a frame control field. The common area includes a trigger frame type. The user specific area may include a user specific field 1, . . . , a user specific field N, and the user specific field N (such as the user specific field 1) may include a first AID field, an OFDMA contention backoff parameter field, and a resource unit indication field. The resource unit indication field is used to indicate a resource for transmitting an urgent report.

FIG. 5 is a diagram of establishing a transmission opportunity for an urgent report by using an AID (such as a third AID) carried in an MU-RTS frame according to an embodiment of this application. An example in which one AP and three STAs: a STA 1, a STA 2, and a STA 3 are drawn is used for description in FIG. 5.

501. An AP sends an MU-RTS frame to a plurality of STAs, the MU-RTS frame includes a third AID, and the plurality of the STAs receive the MU-RTS frame.

502. After receiving the MU-RTS, a STA that needs to transmit an urgent report feeds back a synchronous CTS frame to the AP. The synchronous CTS means that the plurality of the STAs that need to report the CTS simultaneously send the CTS to the AP, and physical layer structures of the CTSs are the same.

503. The AP sends a TF-R frame to the plurality of the STAs, the TF-R frame includes a first AID, and the first AID is used to instruct the plurality of the STAs to contend, based on OFDMA, for a resource used to transmit an urgent report.

504. The plurality of the STAs contend, based on the OFDMA, for the resource used to transmit the urgent report.

505. When a STA 1, a STA 2, and a STA 3 need to transmit an urgent report, and obtain, by contention, a resource used to transmit the urgent report, the STA 1, the STA 2, and the STA 3 send their respective urgent reports to the AP.

506. When receiving urgent reports sent by the STA 1, the STA 2, and the STA 3, the AP feeds back an M-BA frame to the STA, indicating that receiving of the corresponding urgent reports has been acknowledged.

FIG. 6 is a diagram of establishing a transmission opportunity for an urgent report by using an AID (such as a third AID) carried in an MU-RTS frame according to another embodiment of this application.

601. An AP sends an MU-RTS frame to a plurality of STAs, a STA receives the MU-RTS frame, and the MU-RTS frame includes a third AID.

602. The STA that receives the MU-RTS frame sends a CTS frame to the AP, and the AP receives the CTS frame fed back by the STA.

When the plurality of the STAs receive the MU-RTS frame, after receiving the MU-RTS, the plurality of the STAs that need to transmit an urgent report feed back a synchronous CTS frame to the AP. The synchronous CTS means that the plurality of the STAs that need to report the CTS simultaneously send the CTS to the AP, and physical layer structures of the CTSs are the same.

603. The AP sends an access frame to the plurality of the STAs, for example, the access frame may be a frame carrying an emergency RAW IE. The frame carrying the emergency RAW IE may include a second AID and/or an RAW control field. The second AID is used to instruct the STA to contend for a resource used to transmit an urgent report. The RAW control field is used to indicate that a service data type of an access window is the urgent report, and a STA that has the urgent report may use an RAW for access.

604. The plurality of the STAs contend for a resource in a CSMA/CA-based manner.

A STA that receives the frame carrying the emergency RAW IE may contend for the resource, for example, contend in the CSMA/CA-based manner, and in this manner, the urgent report may be transmitted by using the RAW.

605. A STA 1 that obtains a resource by contention sends an urgent report to the AP on the corresponding resource, and the AP receives the urgent report sent by the STA 1.

For the STA 3, it is assumed that the STA 3 does not need to transmit the urgent report, because the RAW is used to transmit only the urgent report, even if the STA 3 needs to transmit common data, the STA 3 cannot transmit the common data by using the RAW. Therefore, the STA 3 does not transmit data in FIG. 6.

606. The AP sends an acknowledgment frame to the STA 1.

607. A STA 2 that obtains a resource by contention sends an urgent report to the AP on the corresponding resource, and the AP receives the urgent report sent by the STA 2.

608. The AP sends an acknowledgment frame to the STA 2.

FIG. 7 is a schematic structural diagram of a frame that carries an emergency access window information element according to an embodiment of this application. The frame that carries the emergency access window information element in FIG. 7 includes an RAW control field, a window duration field, a window start time field, a second AID, a channel indication field, and a periodic indication field, and only at least one of the RAW control field and the second AID needs to be included.

The RAW control field is used to indicate that an access window type is an urgent report, so that a plurality of access window types that may exist can be differentially indicated. Window duration and a window start time indicate an interval for restricting a contention window. Another manner such as a start time and an end time may further be used to perform indication, or default duration or a default interval may be used. The second AID is used to instruct a STA that needs to transmit the urgent report to transmit the urgent report. If the access window type of the urgent report is defined in the RAW control field, the second AID may be omitted. If no type is separately defined for an urgent report window in an RAW type, the second AID may be used to further instruct the STA that needs to transmit the urgent report to transmit the urgent report. A channel indication is used to indicate a channel that allows a STA to contend for. A periodic indication is used to define whether a periodic contention window is used.

FIG. 8 is a schematic diagram of instructing to trigger urgent report transmission by using a TIM carried in a beacon frame according to an embodiment of this application. An example in which one AP and three STAs: a STA 1, a STA 2, and a STA 3 are drawn is used for description in FIG. 8.

801. An AP sends a beacon (Beacon) frame to a plurality of STAs, and the beacon frame includes a TIM field.

Each bit of the TIM corresponds to one associated STA. A bit of the TIM is set to 1, indicating that the AP caches downlink data of a corresponding STA. If a bit of the TIM is set to 0, it indicates that the AP does not include the downlink data of the corresponding STA. Different bits in the TIM correspond to different STAs.

In an embodiment of this application, the TIM may further be multiplexed, and the TIM is used to indicate that the AP triggers the STA to transmit an urgent report in a current beacon frame period. The TIM may be used by the AP to notify the STA in advance to prepare to transmit the urgent report, for example, notify, in advance, the STA that prepares to transmit the urgent report to be no longer hibernated or to be in a wakeup state. This advance notification can reduce a transmission time and improve transmission efficiency.

802. The AP sends a TF-R frame to the plurality of the STAs, and the TF-R frame carries a first AID.

For a specific procedure of step 802, refer to step 301. Details are not described herein again.

803. The plurality of the STAs perform OFDMA contention.

For a specific procedure of step 803, refer to step 302. Details are not described herein again.

804. The plurality of the STAs send their respective urgent reports on a resource obtained by contention.

For a specific procedure of step 804, refer to step 303. Details are not described herein again.

805. The AP sends an M-BA frame to the plurality of the STAs.

For a specific procedure of step 805, refer to step 304. Details are not described herein again.

FIG. 9 is a schematic diagram of transmitting an urgent report by using a relay according to an embodiment of this application.

For a long-distance transmission requirement between some STAs and an AP, a relay may be needed to forward service data. The relay may receive a control frame from the AP and send the control frame to a STA associated with the relay. A STA that needs to transmit first-type service data receives the control frame sent by the relay, performs channel contention based on the control frame, and transmits the urgent report to the relay on a channel obtained by contention. In other words, the relay may forward a trigger frame and the urgent report between the AP and the STA. However, the foregoing manner of using a relay operation may increase a delay.

To reduce the delay, when the AP may transmit the control frame to the relay, in step 901, the AP may simultaneously send a TF-R frame to another STA (such as a STA 1), and the TF-R frame includes an AID X.

The TF-R frame may further include resource allocation information for an entire transmission bandwidth, and perform resource allocation for the entire transmission bandwidth. Some resources are allocated to an associated STA that needs to transmit an emergency service, to perform contention transmission, for example, a channel 2 in the figure. Some resources such as a channel 1 in the figure are allocated to the relay, causing the relay to forward the trigger frame and the urgent report between the AP and the STA, and causing the relay to collect the urgent report of the STA associated with the relay and agree on an end time of parallel processing. In step 902, on the channel 2, the STA 1 receives the TF-R frame sent by the AP, performs OFDMA contention for the urgent report, and transmits an urgent report to the AP on a channel obtained by contention, and the AP feeds back an acknowledgment frame to the STA when receiving the urgent report. In step 903, on the channel 1, the relay receives the TF-R frame and forwards the TF-R frame to the STA (such as a STA 2) associated with the relay, and the STA 2 receives the TF-R frame, performs OFDMA contention for the urgent report, and transmits an urgent report on a resource obtained by contention. An end time of step 902 and step 903 is the agreed end time of the parallel processing in the resource allocation information.

Step 904. After the end time of the parallel processing, the relay forwards the collected urgent report to the AP, or the relay sends the urgent report to the AP in advance in an OFDMA contention manner by using the channel 2. Step 905. After receiving the collected urgent report forwarded by the relay, the AP sends an acknowledgment frame to the relay, and the acknowledgment frame is used to indicate that the AP has received the urgent report sent by the relay. In this way, transmission efficiency of the urgent report can be improved by using the relay.

FIG. 10 is a schematic structural diagram of a frame that uses HE-A-Control to carry cache information of an AID (such as a fourth AID) according to an embodiment of this application.

The fourth AID in this embodiment of this application is included in requirement information, and the fourth AID is used to indicate a requirement that a third STA transmits first-type service data or indicate a size of the first-type service data of the third STA that needs to be transmitted by the third STA. The third STA is a station that has an urgent report transmission requirement, but due to a channel status or a distance restriction, the third STA cannot transmit an urgent report to an AP in some cases. A first STA is a station surrounding the third STA, and may help the third STA complete transmission of urgent report requirement information. In this way, the transmission requirement of the third STA for transmitting the urgent report can be met.

In the frame structure shown in FIG. 10, a very high throughput (VHT) occupies one bit, high efficient (HE) occupies one bit, and aggregated control occupies 30 bits. An aggregated control field includes a control 1 (Control 1) field, . . . , a control N field, and a padding field. The control 1 field includes a control ID field and a control information field. A control information field includes cache information and a quantity of requirement times. In another embodiment of this application, the control ID field in a high efficient aggregated control (HE-A-Control) field of a high throughput control field shown in FIG. 10 may be used to carry the cache information of the fourth AID.

The HE-A-Control field may carry 1 to N control signaling, and a control ID is used to indicate that a control signaling type is the cache information of the fourth AID. In an embodiment of this application, a new control signaling type may be defined as the cache information of the fourth AID, and information that may be carried includes a size of the cache information of the fourth AID and a quantity of collected cache requirements. In another embodiment of this application, control signaling of the cache information may be first defined, and then a bit is used to indicate whether the cache information is own cache information, or cache information of another STA.

To prevent a broadcast storm caused by required broadcast, in other words, to prevent continuously repeated broadcast, whether to allow forwarding a requirement and a quantity of forwarding times may be limited. For example, it may be restricted that only a STA that has a requirement can broadcast the requirement of the STA, and the another STA may only send the requirement to the AP and cannot continue to broadcast the requirement.

The foregoing describes in detail that an AID or an RAW control field in a control frame is used to instruct, to perform uplink data transmission, a STA that has a first-type service data transmission requirement with reference to FIG. 2 to FIG. 10. The following gives a description that an AP transmits first-type service data in a downlink direction with reference to FIG. 11 and FIG. 12.

Figure 11:
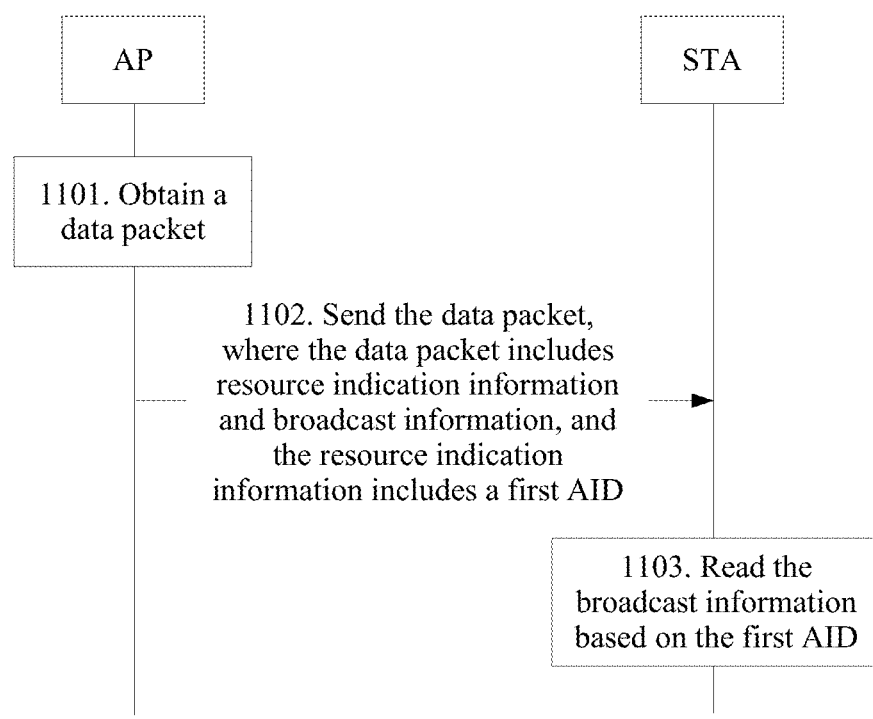
FIG. 11 is a schematic flowchart of a service data transmission method according to another embodiment of this application.

FIG. 11 is a schematic flowchart of a service data transmission method according to another embodiment of this application.

1101. An AP obtains a data packet, the data packet includes resource indication information and broadcast information, and the resource indication information includes a first AID.

The AP may transmit service data in a downlink direction in a multi-user format, and the resource indication information may be included in high efficiency signaling B of the data packet, namely, an HE-SIG-B field. The first AID is used to instruct, to read the broadcast information, a station STA participating in transmitting first-type service data.

1102. The AP sends the data packet to a STA, and the STA receives the data packet sent by the AP.

1103. The STA reads the broadcast information based on the first AID in the data packet.

The data packet includes the resource indication information and the broadcast information, and the resource indication information includes the first AID. The first AID is used to instruct, to read the broadcast information, the station STA participating in transmitting the first-type service data, and a station (STA) that does not participate in first-type service data transmission does not need to read the broadcast information. In other words, the STA participating in the first-type service data may read data in the data packet, for example, read the urgent report in FIG. 12. The STA receives the data packet, and may instruct the STA to read the broadcast information based on information carried in the data packet. In this way, transmission of downlink service data may be completed, and transmission efficiency of the service data is improved.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

Figure 12:
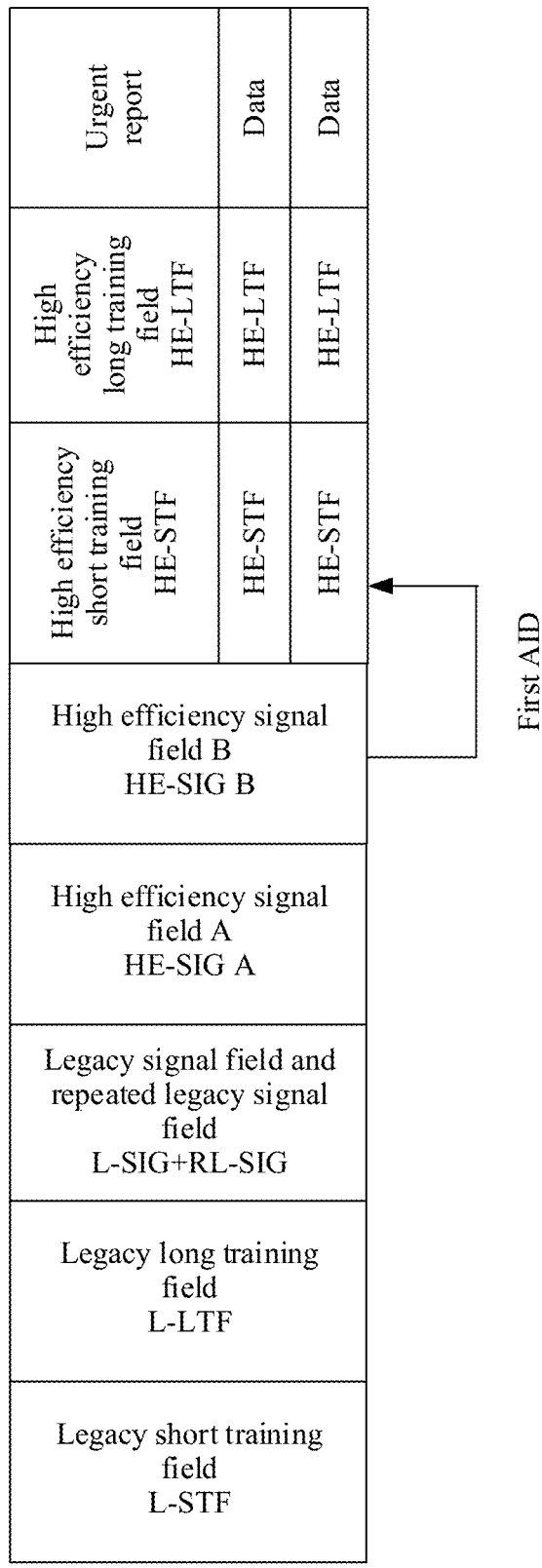
FIG. 12 is a schematic diagram of resource indication performed by using a first AID carried in an HE-SIG-B field according to an embodiment of this application.

FIG. 12 is a schematic diagram of resource indication performed by using a first AID carried in an HE-SIG-B field according to an embodiment of this application. A frame structure of a data packet in FIG. 12 includes a legacy short training field (L-STF), a legacy long training field (L-LTF), a legacy signal field (L-SIG) and a repeated legacy signal field, a high efficiency signal field (HE-SIG) A, a high efficiency signal field B, a high efficiency short training field (HE-STF), a high efficiency long training field (HE-LTF), and a data field. An example in which the data field herein is an urgent report is used for description.

Service data transmission methods according to the embodiments of this application are described in detail above with reference to FIG. 2 to FIG. 12. The following describes an access point and a station for transmitting service data according to the embodiments of this application with reference to FIG. 13 to FIG. 20.

Figure 13:
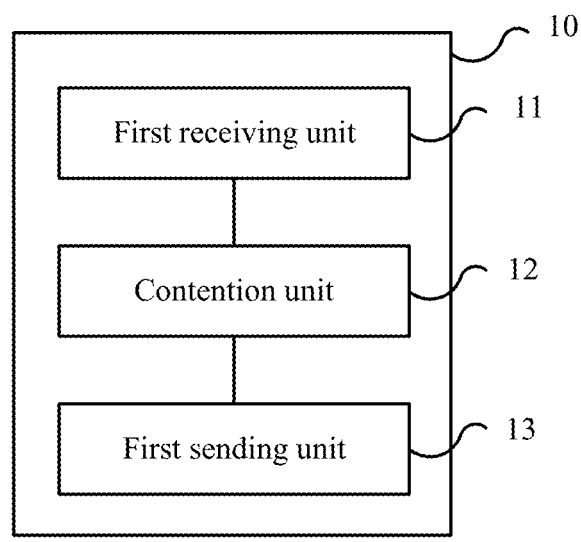
FIG. 13 is a block diagram of a station according to an embodiment of this application.

FIG. 13 is a block diagram of a station according to an embodiment of this application. The station 10 in FIG. 13 includes a first receiving unit 11, a contention unit 12, and a first sending unit 13.

The first receiving unit 11 is configured to receive a control frame, where the control frame includes control information, and the control information is used to instruct the STA to contend for a resource used to transmit first-type service data.

The contention unit 12 is configured to contend for the resource based on the control information received by the first receiving unit.

The first sending unit 13 is configured to send the first-type service data of the STA to an access point AP on the resource obtained by the contention unit by contention.

In this embodiment of this application, the AP triggers the STA to perform a procedure of transmitting the first-type service data, and the STA sends the first-type service data to the AP on the resource obtained by contention. In this way, a contention delay can be reduced, and transmission efficiency can be improved.

The station in this embodiment of this application may be corresponding to the first station in the method embodiment of this application in FIG. 2 and the station in FIG. 3, FIG. 5, FIG. 6, and FIG. 8. In addition, the units/modules in the station and the foregoing other operations and/or functions are respectively intended to implement corresponding procedures of the corresponding STA in the foregoing method. For brevity, details are not repeated herein.

Figure 14:
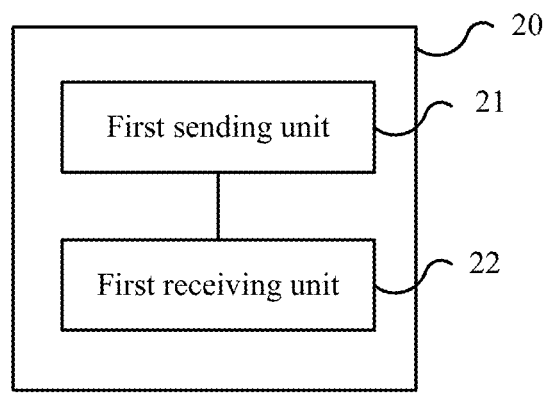
FIG. 14 is a block diagram of an access point according to an embodiment of this application.

FIG. 14 is a block diagram of an access point according to an embodiment of this application. The access point 20 in FIG. 14 includes a first sending unit 21 and a first receiving unit 22.

The first sending unit 21 is configured to send a control frame to a first station STA, where the control frame includes control information, and the control information is used to instruct the first STA to contend for a resource used to transmit first-type service data.

The first receiving unit 22 is configured to receive the first-type service data of the first STA on the resource obtained by the first STA by contention.

In this embodiment of this application, the AP triggers a STA to perform a procedure of transmitting the first-type service data, and the STA sends the first-type service data to the AP on the resource obtained by contention. In this way, a contention delay can be reduced, and transmission efficiency can be improved.

The access point in this embodiment of this application may be corresponding to the AP in the method embodiment of this application in FIG. 2 and the AP in FIG. 3, FIG. 5, FIG. 6, and FIG. 8. In addition, the units/modules in the AP and the foregoing other operations and/or functions are respectively intended to implement corresponding procedures of the corresponding AP in the foregoing method. For brevity, details are not repeated herein.

Figure 15:
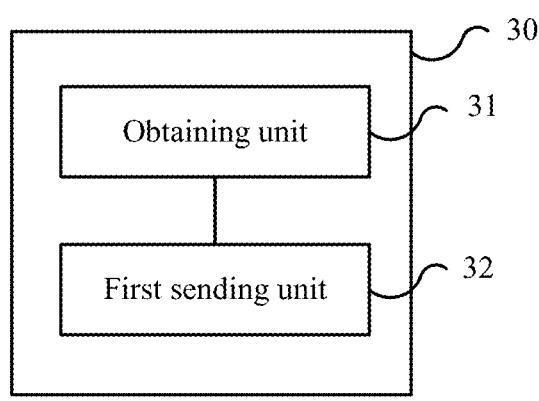
FIG. 15 is a block diagram of an access point according to another embodiment of this application.

FIG. 15 is a block diagram of an access point according to another embodiment of this application. The access point 30 in FIG. 15 includes an obtaining unit 31 and a first sending unit 32.

The obtaining unit 31 is configured to obtain a data packet, where the data packet includes resource indication information and broadcast information, the resource indication information includes a first AID, and the first AID is used to instruct, to read the broadcast information, a station STA participating in transmitting first-type service data.

The first sending unit 32 is configured to send the data packet obtained by the obtaining unit to the STA.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

The access point in this embodiment of this application may be corresponding to the AP in the method embodiment of this application in FIG. 11. In addition, the units/modules in the AP and the foregoing other operations and/or functions are respectively intended to implement corresponding procedures of the corresponding AP in the foregoing method. For brevity, details are not repeated herein.

Figure 16:
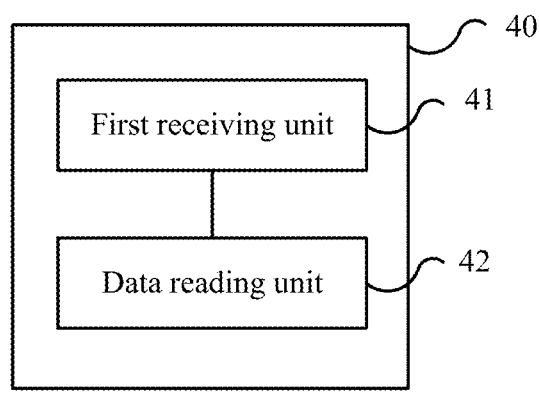
FIG. 16 is a block diagram of a station according to another embodiment of this application.

FIG. 16 is a block diagram of a station according to another embodiment of this application. The station 40 in FIG. 16 includes a first receiving unit 41 and a data reading unit 42.

The first receiving unit 41 is configured to receive a data packet, where the data packet includes resource indication information and broadcast information, the resource indication information includes a first AID, and the first AID is used to instruct, to read the broadcast information, a STA participating in transmitting first-type service data.

The data reading unit 42 is configured to read the broadcast information based on the first AID in the data packet received by the first receiving unit.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

The station in this embodiment of this application may be corresponding to the STA in the method embodiment of this application in FIG. 11. In addition, the units/modules in the STA and the foregoing other operations and/or functions are respectively intended to implement corresponding procedures of the corresponding STA in the foregoing method. For brevity, details are not repeated herein.

Figure 17:
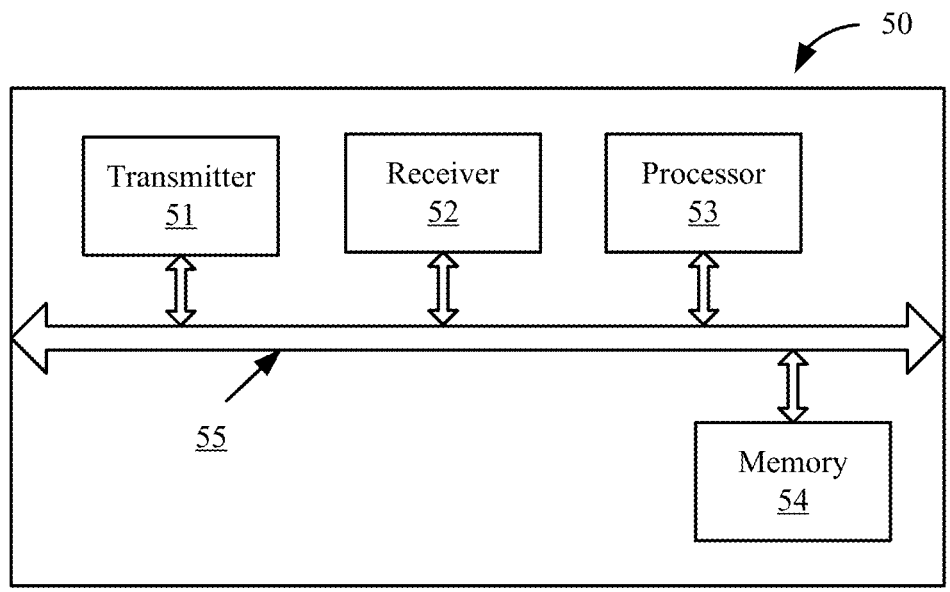
FIG. 17 is a block diagram of a station according to another embodiment of this application.

FIG. 17 is a block diagram of a station according to another embodiment of this application. The station 50 in FIG. 17 includes a transmitter 51, a receiver 52, a processor 53, and a memory 54, and various components may be coupled together by using a bus system 55.

Specifically, the receiver 52 is configured to receive a control frame, where the control frame includes control information, and the control information is used to instruct a STA to contend for a resource used to transmit first-type service data.

The processor 53 is configured to contend for the resource based on the received control information.

The transmitter 51 is configured to send the first-type service data of the STA to an access point AP on the resource obtained by a contention unit by contention.

In this embodiment of this application, the AP triggers the STA to perform a procedure of transmitting the first-type service data, and the STA sends the first-type service data to the AP on the resource obtained by contention. In this way, a contention delay can be reduced, and transmission efficiency can be improved.

The station in this embodiment of this application may be corresponding to the first station in the method embodiment of this application in FIG. 2 and the station in FIG. 3, FIG. 5, FIG. 6, and FIG. 8. In addition, the units/modules in the station and the foregoing other operations and/or functions are respectively intended to implement corresponding procedures of the corresponding STA in the foregoing method. For brevity, details are not repeated herein.

Figure 18:
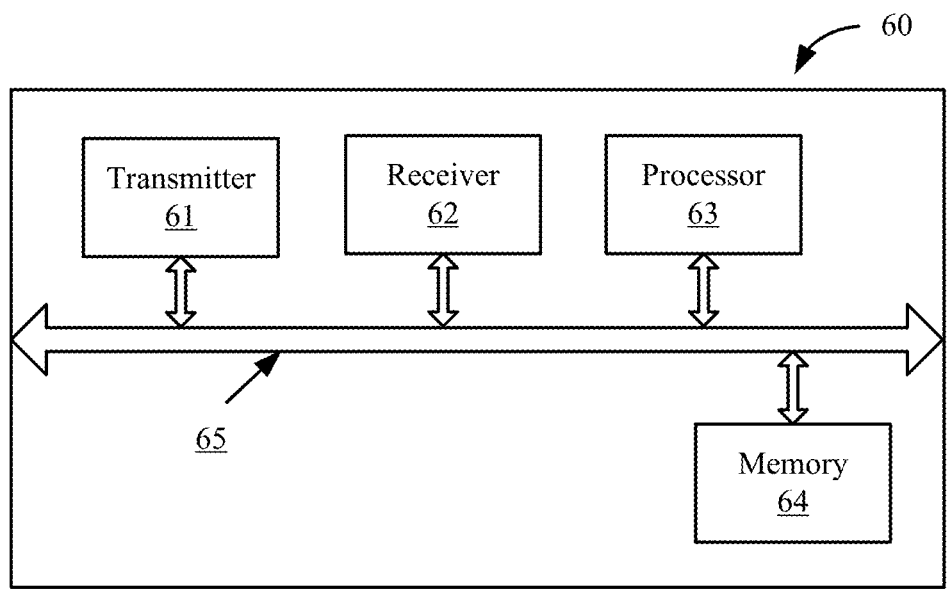
FIG. 18 is a block diagram of an access point according to another embodiment of this application.

FIG. 18 is a block diagram of an access point according to another embodiment of this application. The access point 60 in FIG. 18 includes a transmitter 61, a receiver 62, a processor 63, and a memory 64, and various components may be coupled together by using a bus system 65.

Specifically, the transmitter 61 is configured to send a control frame to a first station STA, where the control frame includes control information, and the control information is used to instruct the first STA to contend for a resource used to transmit first-type service data.

The receiver 62 is configured to receive the first-type service data of the first STA on the resource obtained by the first STA by contention.

In this embodiment of this application, the AP triggers the STA to perform a procedure of transmitting the first-type service data, and the STA sends the first-type service data to the AP on the resource obtained by contention. In this way, a contention delay can be reduced, and transmission efficiency can be improved.

The access point in this embodiment of this application may be corresponding to the AP in the method embodiment of this application in FIG. 2 and the AP in FIG. 3, FIG. 5, FIG. 6, and FIG. 8. In addition, the units/modules in the AP and the foregoing other operations and/or functions are respectively intended to implement corresponding procedures of the corresponding AP in the foregoing method. For brevity, details are not repeated herein.

Figure 19:
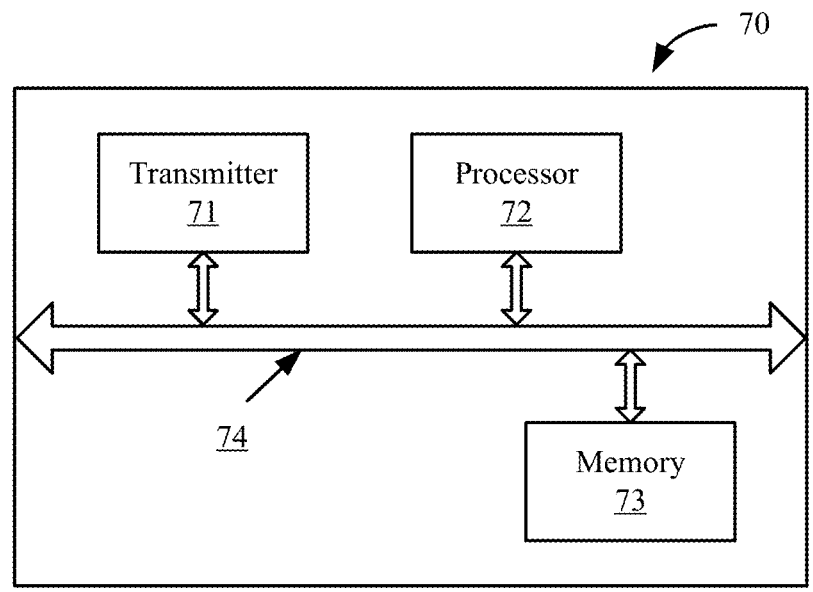
FIG. 19 is a block diagram of an access point according to another embodiment of this application.

FIG. 19 is a block diagram of an access point according to another embodiment of this application. The access point in FIG. 19 includes a transmitter 71, a processor 72, and a memory 73, and various components may be coupled together by using a bus system 74.

Specifically, the processor 72 is configured to obtain a data packet, where the data packet includes resource indication information and broadcast information, the resource indication information includes a first AID, and the first AID is used to instruct, to read the broadcast information, a station STA participating in transmitting first-type service data.

The transmitter 71 is configured to send the obtained data packet to the STA.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

The access point in this embodiment of this application may be corresponding to the AP in the method embodiment of this application in FIG. 11. In addition, the units/modules in the AP and the foregoing other operations and/or functions are respectively intended to implement corresponding procedures of the corresponding AP in the foregoing method. For brevity, details are not repeated herein.

Figure 20:
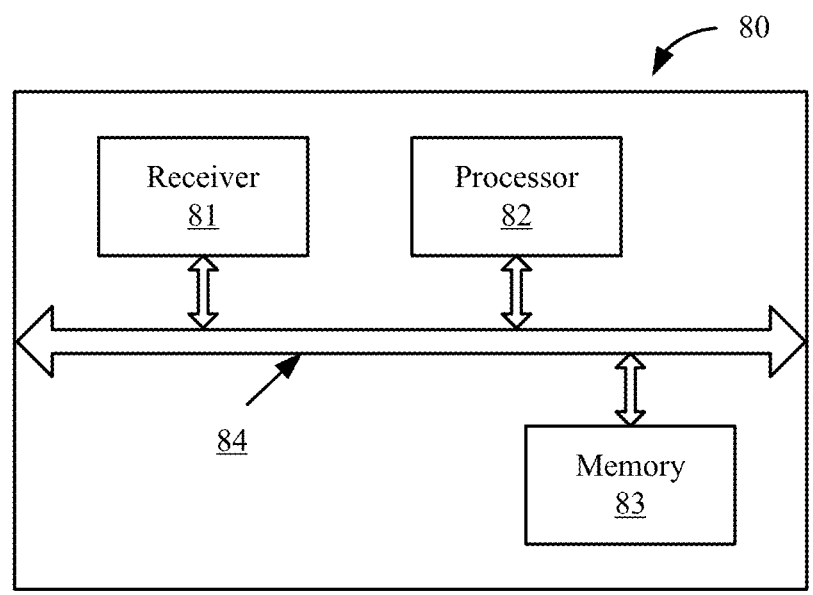
FIG. 20 is a block diagram of a station according to another embodiment of this application.

FIG. 20 is a block diagram of a station according to another embodiment of this application. The station in FIG. 20 includes a receiver 81, a processor 82, and a memory 83, and various components may be coupled together by using a bus system 84.

Specifically, the receiver 81 is configured to receive a data packet, where the data packet includes resource indication information and broadcast information, the resource indication information includes a first AID, and the first AID is used to instruct, to read the broadcast information, a STA participating in transmitting first-type service data.

The processor 82 is configured to read the broadcast information based on the first AID in the received data packet.

In this embodiment of this application, the AP sends, to the STA, the data packet that includes the resource indication information and the broadcast information, so that the STA may start a procedure of transmitting the first-type service data based on an AID in the resource indication information when receiving the data packet, so as to improve transmission efficiency.

The station in this embodiment of this application may be corresponding to the STA in the method embodiment of this application in FIG. 11. In addition, the units/modules in the STA and the foregoing other operations and/or functions are respectively intended to implement corresponding procedures of the corresponding STA in the foregoing method. For brevity, details are not repeated herein.

The processor in FIG. 17 to FIG. 20 controls an operation of an access point or a station, and may be configured to process a signal. The memory may include a read-only memory and a random access memory, and provides an instruction and data to the processor. The transmitter and the receiver may be coupled to an antenna. Components of the access point or the station are coupled together by using a bus system. In addition to a data bus, the bus system includes a power bus, a control bus, and a status signal bus. However, for clear description, various types of buses in the figure are marked as the bus system.

The methods provided in the foregoing embodiments of this application may be applied to the processor, the receiver, and the transmitter, or be implemented by the processor, the receiver, and the transmitter. In an implementation process, steps in the foregoing methods can be implemented by using a hardware integrated logical circuit in the processor, receiver, or transmitter, or by using instructions in a form of software. The processor may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner.

It should be understood that in the embodiments of this application, sequence numbers of the foregoing processes do not mean execution sequences. The execution sequences of the processes should be determined based on functions and internal logic of the processes, and should not be construed as any limitation on the implementation processes of the embodiments of this application.

It should be understood that in the embodiments of this application, "B corresponding to A" indicates that B is associated with A, and B may be determined based on A. However, it should be further understood that determining B based on A does not mean that B is determined based only on A, and B may also be determined based on A and/or other information.

A person of ordinary skill in the art may be aware that, in combination with the examples described in the embodiments provided in this specification, method steps and units may be implemented by electronic hardware, computer software, or a combination thereof. To clearly describe interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application. However, it should not be considered that the implementation goes beyond the scope of this application.

Methods or steps described in the embodiments provided in this specification may be implemented by hardware, a software program executed by a processor, or a combination thereof. The software program may be stored in a random access memory (RAM), memory, a read-only memory (ROM), an electrically programmable read-only memory (EPROM), an electrically erasable programmable read-only memory (EEPROM), a register, a hard disk, a removable magnetic disk, a compact disc read-only memory (CD-ROM), or a storage medium in any other forms well-known in the technical field.

Although this application is described in detail with reference to the accompanying drawings and in combination with the embodiments, this application is not limited thereto. Various equivalent modifications or replacements can be made to the embodiments of this application by a person of ordinary skill in the art without departing from the essence of this application, and the modifications or replacements shall fall within the scope of this application.

What is claimed is:

1. A service data transmission method, comprising:
   receiving, by a first station (STA), a control frame comprising a resource indication field and a first association identifier (AID), wherein the resource indication field indicates a resource used to transmit first-type service data, and the first AID instructs the first STA how to contend for the resource indicated by the resource indication field for transmitting the first-type service data;
   contending, by the first STA, for the resource based on the resource indication field and the first AID; and
   sending, by the first STA, the first-type service data of the first STA to an access point (AP), on the resource obtained by contention,
   wherein the first association identifier (AID) corresponds to a specific contention manner of contending for the resource used to transmit the first-type service data and that is not an AID to be allocated to any specific STA by the AP, and the first STA contends for the resource based on an agreement between the AP and the first STA on a correspondence between the first AID and the specific contention manner,
   wherein the first AID instructs the first STA to contend for the resource indicated by the resource indication field in a random contention manner.

2. The method according to claim 1, wherein:
   the receiving, by a first STA, a control frame comprises:
   receiving, by the first STA, a trigger frame, wherein the trigger frame carries the first AID.

3. The method according to claim 2, wherein the first AID instructs the first STA to randomly contend for the resource based on orthogonal frequency division multiple access (OFDMA); and the contending, by the first STA, for the resource based on the resource indication field and the first AID comprises:
   randomly contending, by the first STA, for the resource based on the OFDMA.

4. The method according to claim 2, wherein a contention backoff window of the first STA is smaller than a contention backoff window of a second STA, and/or a backoff value of the first STA is less than a backoff value of the second STA, wherein the second STA is not configured to transmit the first-type service data.

5. The method according to claim 1, wherein the receiving, by a first STA, a control frame comprises:
   receiving, by the first STA, an access frame configured by the AP, wherein the access frame comprises a second AID and/or a restricted access window (RAW) control field, the second AID instructs the first STA to contend for the resource used to transmit the first-type service data, and the RAW control field indicates that a service data type of an access window is the first-type service data.

6. A service data transmission method, comprising:
   sending, by an access point (AP), a control frame to a first station (STA), wherein the control frame comprises a resource indication field and a first association identifier (AID), wherein the resource indication field indicates a resource used to transmit first-type service data, and the first AID instructs the first STA how to contend for the resource indicated by the resource indication field for transmitting the first-type service data; and
   receiving, by the AP, from the first STA the first-type service data of the first STA on the resource obtained by the first STA by contention,
   wherein the first association identifier (AID) corresponds to a specific contention manner of contending for the resource used to transmit the first-type service data and that is not an AID to be allocated to any specific STA by the AP, and the first STA contends for the resource based on an agreement between the AP and the first STA on a correspondence between the first AID and the specific contention manner,
   wherein the first AID instructs the first STA to contend for the resource indicated by the resource indication field in a random contention manner.

7. The method according to claim 6, wherein:
   the control frame comprises a trigger frame carrying the first AID.

8. The method according to claim 6, wherein:
   a contention backoff window of the first STA is smaller than a contention backoff window of another STA and/or a backoff value of the first STA is less than a backoff value of the other STA, and wherein the other STA is not configured to transmit the first-type service data.

9. The method according to claim 6, wherein:
the control frame comprises an access frame comprising:
   a second AID that instructs the first STA to contend for the resource; and/or
   a restricted access window (RAW) control field for indicating that a service data type of an access window is the first-type service data.

10. The method according to claim 6, further comprising, before sending the control frame to the first STA,
sending, by the AP, a multiple user request to send (MU-RTS frame) to the first STA, wherein the MU-RTS frame carries a third AID that indicates to the first STA that the AP subsequently schedules the first STA to transmit the first-type service data, and
receiving, by the AP, a clear to send (CTS) frame from the first STA.

11. A station (STA), comprising:
a receiver, configured to receive a control frame comprising a resource indication field and a first association identifier (AID), wherein the resource indication field indicates a resource used to transmit first-type service data, and the first AID instructs the STA how to contend for the resource indicated by the resource indication field for transmitting the first-type service data;
at least one processor, configured to contend for the resource based on the resource indication field and the first AID received by the receiver; and
a transmitter, configured to send the first-type service data of the STA to an access point (AP) on the resource contended by the at least one processor,
wherein, the first AID corresponds to a specific contention manner of contending for the resource used to transmit the first-type service data and that is not an AID to be allocated to any specific STA by the AP, and the STA is configured to contend for the resource based on an agreement between the AP and the STA on a correspondence between the first AID and the specific contention manner,
wherein the first AID instructs the first STA to contend for the resource indicated by the resource indication field in a random contention manner.

12. The STA according to claim 11, wherein the receiver is further configured to receive a trigger frame carrying the first AID.

13. The STA according to claim 12, wherein:
the first AID instructs the STA to randomly contend for the resource based on orthogonal frequency division multiple access (OFDMA); and
the at least one processor is further configured to randomly contend for the resource based on the OFDMA.

14. The STA according to claim 12, wherein:
a contention backoff window of the STA is smaller than a contention backoff window of another STA and/or a backoff value of the STA is less than a backoff value of the other STA, and wherein the other STA is not configured to transmit the first-type service data.

15. The STA according to claim 11, wherein the receiver is further configured to receive an access frame configured by the AP, the access frame comprising:
   a second AID instructing the STA to contend for the resource; and/or
   a restricted access window (RAW) control field indicating that a service data type of an access window is the first-type service data.

16. An access point (AP), comprising:
a transmitter, configured to send a control frame to a first station (STA), wherein the control frame comprises a resource indication field and a first association identifier (AID), wherein the restore indication field indicates a resource used to transmit first-type service data, and the first AID instructs the first STA how to contend for the resource indicated by the resource indication field for transmitting the first-type service data; and
a receiver, configured to receive the first-type service data of the first STA on the resource obtained by the first STA by contention,
wherein the first AID corresponds to a specific contention manner of contending for the resource used to transmit the first-type service data and that is not an AID to be allocated to any specific STA by the AP, and the first STA contends for the resource based on an agreement between the AP and the first STA on a correspondence between the first AID and the specific contention manner,
wherein the first AID instructs the first STA to contend for the resource indicated by the resource indication field in a random contention manner.

17. The AP according to claim 16, wherein:
The transmitter is further configured to send a trigger frame to the first STA, and the trigger frame carries the first AID.

18. The AP according to claim 16, wherein a contention backoff window of the first STA is smaller than a contention backoff window of another STA and/or a backoff value of the first STA is less than a backoff value of the other STA, and wherein the other STA is not configured to transmit the first-type service data.

19. The AP according to claim 16, wherein the transmitter is further configured to send, to the first STA an access frame configured by the AP, the access frame comprising:
   a second AID that instructs the first STA to contend for the resource; and/or
   a restricted access window (RAW) control field for indicating that a service data type of an access window is the first-type service data.

20. The AP according to claim 16, wherein:
the transmitter is further configured to send a multiple user request to send multiple user request to send (MU-RTS) frame to the first STA, wherein the MU-RTS frame carries a third AID for indicating that the AP subsequently schedules the first STA to transmit the first-type service data; and
the receiver is further configured to receive a clear to send (CTS) frame from the first STA.

* * * * *

UNITED STATES PATENT AND TRADEMARK OFFICE
CERTIFICATE OF CORRECTION

PATENT NO. : 11,770,866 B2  Page 1 of 1
APPLICATION NO. : 16/287929
DATED : September 26, 2023
INVENTOR(S) : Jian Yu et al.

It is certified that error appears in the above-identified patent and that said Letters Patent is hereby corrected as shown below:

In the Claims

Column 32, Claim 16, Line 13, change "restore" to "resource"; and

Column 32, Claim 20, Line 52, change "to send multiple user request" to "to send a multiple user request".

Signed and Sealed this
Twenty-fourth Day of October, 2023

Katherine Kelly Vidal
*Director of the United States Patent and Trademark Office*